(12) United States Patent
Nakatsu

(10) Patent No.: US 9,283,959 B2
(45) Date of Patent: Mar. 15, 2016

(54) VEHICLE BEHAVIOR CONTROL APPARATUS

(75) Inventor: Masatoshi Nakatsu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/380,475

(22) PCT Filed: Feb. 24, 2012

(86) PCT No.: PCT/JP2012/054596
§ 371 (c)(1),
(2), (4) Date: Aug. 22, 2014

(87) PCT Pub. No.: WO2013/125031
PCT Pub. Date: Aug. 29, 2013

(65) Prior Publication Data
US 2015/0032333 A1    Jan. 29, 2015

(51) Int. Cl.
*B60W 10/22* (2006.01)
*B60W 30/02* (2012.01)
*B60G 17/016* (2006.01)
*B60G 21/10* (2006.01)
*B60G 17/0195* (2006.01)
(Continued)

(52) U.S. Cl.
CPC ......... *B60W 30/025* (2013.01); *B60G 17/0195* (2013.01); *B60G 17/02* (2013.01); *B60G 17/06* (2013.01); *B60W 10/08* (2013.01); *B60W 10/192* (2013.01); *B60W 10/22* (2013.01); *B60W 30/04* (2013.01); *B60G 2204/182* (2013.01); *B60W 2030/043* (2013.01)

(58) Field of Classification Search
CPC ............. B60W 10/22; B60W 30/025; B60W 50/0098; B60G 17/052; B60G 21/06; B60G 21/067; B60G 21/073; B60G 17/0195
USPC .................... 701/37, 38; 280/5.507
See application file for complete search history.

(56) References Cited

U.S. PATENT DOCUMENTS 3,881,736 A * 5/1975 Wilfert ................. 280/5.507
5,193,845 A * 3/1993 Yokote et al. ............. 280/5.503
(Continued)

FOREIGN PATENT DOCUMENTS

JP   2005-186865 A   7/2005
JP   A-2006-109642   4/2006
(Continued)

*Primary Examiner* — Behrang Badii
*Assistant Examiner* — David Testardi
(74) *Attorney, Agent, or Firm* — Oliff PLC

(57) ABSTRACT

In order to control a behavior generated on a body as a result of a travel of a vehicle, an electronic control unit controls rotation of each of in-wheel motors, thereby generating a predetermined braking force or driving force approximately the same in magnitude on each wheel. Meanwhile, the electronic control unit uses respective pipelines and a direction control circuit depending on the behavior generated on the body to connect fluid pressure cylinders on a fluid pressure supplying side and fluid pressure cylinders on a fluid pressure supplied side to each other for communication. As a result, the fluid pressure cylinders convert vertical forces of the body acting as component forces of a predetermined braking/driving force into hydraulic pressures and supply the fluid pressure cylinders with the hydraulic pressures, and the fluid pressure cylinders convert the supplied hydraulic pressures into vertical forces, thereby exerting the vertical forces on the body.

10 Claims, 14 Drawing Sheets

(51) Int. Cl.
*B60G 17/02* (2006.01)
*B60G 17/06* (2006.01)
*B60W 10/08* (2006.01)
*B60W 10/192* (2012.01)
*B60W 30/04* (2006.01)

(56) References Cited

U.S. PATENT DOCUMENTS

| | | | | |
|---|---|---|---|---|
| 5,475,593 | A * | 12/1995 | Townend | 701/38 |
| 5,794,966 | A * | 8/1998 | MacLeod | 280/5.507 |
| 7,599,763 | B2 * | 10/2009 | Matsumoto et al. | 701/1 |
| 7,788,011 | B2 * | 8/2010 | Sugiyama | 701/69 |
| 8,521,349 | B2 * | 8/2013 | Yu et al. | 701/22 |
| 2005/0228565 | A1 * | 10/2005 | Lohner et al. | 701/41 |
| 2006/0076740 | A1 | 4/2006 | Sugiyama | |
| 2007/0088476 | A1 * | 4/2007 | Mizuta | 701/38 |
| 2007/0150116 | A1 * | 6/2007 | Schwarz et al. | 701/1 |

FOREIGN PATENT DOCUMENTS

| | | | |
|---|---|---|---|
| JP | 2006315483 A * | 11/2006 | |
| JP | A-2007-237882 | 9/2007 | |
| JP | 2008168861 A * | 7/2008 | |
| JP | 2008-247067 A | 10/2008 | |
| JP | A-2009-143310 | 7/2009 | |
| JP | 2009173089 A * | 8/2009 | |
| JP | 2009196504 A * | 9/2009 | |
| JP | 2010241430 A * | 10/2010 | |
| JP | 2011031739 A * | 2/2011 | |
| JP | 2012030760 A * | 2/2012 | |

* cited by examiner

VEHICLE BEHAVIOR CONTROL APPARATUS

TECHNICAL FIELD

The present invention relates to a vehicle behavior control apparatus for independently controlling a driving force or a braking force to be generated on each of wheels of a vehicle depending on a behavior generated on a body of the vehicle.

BACKGROUND ART

In recent years, as a form of an electric vehicle, there has been developed a vehicle of so-called in-wheel motor type including a motor arranged inside or in a neighborhood of a wheel forming an unsprung member of the vehicle and using the motor to directly drive the wheel. On the vehicle of in-wheel motor type, a driving force or a braking force imparted to each wheel can individually be controlled depending on a travel condition of the vehicle by independently controlling rotation of the motor provided to each wheel, in other words, independently controlling driving (power running) or regeneration of each motor.

Regarding the vehicle of the in-wheel motor type, for example, in Patent Literature 1, there is disclosed a cruise control apparatus for a vehicle including braking/driving force outputting means for outputting a braking/driving force to respective wheels, and control means for controlling a yaw behavior of the vehicle and controlling the braking/driving force outputting means so as to restrain a roll behavior of the vehicle generated in correspondence to a suspension characteristic of the vehicle as a result of the control of the yaw behavior of the vehicle.

Moreover, in Patent Literature 2, there is disclosed a braking/driving force control apparatus for a vehicle for calculating driving forces or braking forces to be added to the respective wheels depending on an average sprung displacement and an average sprung speed of a body and individually adding the calculated driving forces or braking forces to driving forces during traveling of the respective wheels, thereby restraining a body from bouncing.

Further, in Patent Literature 3, there is disclosed a vehicle including shock absorbers respectively at a pair of left and right front wheels and a pair of left and right rear wheels and including a cross-coupling type shock absorber system.

CITATION LIST

Patent Literature

[PTL 1] JP 2009-143310 A
[PTL 2] JP 2006-109642 A
[PTL 3] JP 2007-237882 A

SUMMARY OF INVENTION

By the way, in a case where driving forces or braking forces generated on respective wheels are individually (independently) controlled to control a behavior of a body, for example, driving forces or braking forces are generated on a front wheel side and braking forces or driving forces are generated on a rear wheel side to apply forces in a vertical direction (vertical forces) to the body forming a sprung member, to thereby control the behavior generated on the body. For example, regarding a behavior in a roll direction generated on a body of a vehicle in a turning state, the roll behavior can be controlled by applying vertical forces in vertically opposite directions in a lateral direction of the vehicle to the body. Moreover, for example, regarding a vertical behavior generated on the body of the vehicle in an acceleration/deceleration state or a bump passing state, vertical forces opposite or same in the vertical direction can be applied to the body in a longitudinal direction of the vehicle to control a pitch behavior or a bouncing behavior (heave behavior).

In a vehicle, in general, suspension mechanisms each coupling a wheel forming an unsprung member and a body forming a sprung member suspend the front left and right wheels and the rear left and right wheels with respect to the body. Therefore, in a case where the driving forces or braking forces are generated on the respective wheels to apply vertical forces to the body as described above, the vertical forces are generated on the respective wheel sides to act on the body via the suspension mechanisms. On this occasion, in general, the suspension mechanism is provided so that the suspension geometry is different between the front wheel side and the rear wheel side in consideration of ride comfort, braking/driving attitudes, and the like. As a result, suspension characteristics (such as an instantaneous rotation center position in the suspension mechanism) are different between the front wheel side and the rear wheel side, and a vertical force generated on the wheel side to act on the body is thus different between the front wheel side and the rear wheel side.

Thus, in a case where, for example, driving forces or braking forces approximately the same in magnitude are generated respectively on the front wheel side and the rear wheel side in order to prevent unnecessary acceleration/deceleration in the longitudinal direction on the traveling vehicle, the vertical forces acting on the body are different owing to the difference in the suspension geometry. Therefore, intended behavior and stability of the body may not be acquired by controlling only the driving forces or braking forces generated on the respective wheels.

The present invention has been made in view of the above-mentioned problem, and has an object to provide a vehicle behavior control apparatus for controlling a driving force or a braking force generated on each of wheels of a vehicle depending on a behavior generated on a body of the vehicle and appropriately controlling vertical forces applied to the body.

In order to achieve the above-mentioned object, a vehicle behavior control apparatus according to the present invention includes a braking/driving force generation mechanism, a suspension mechanism, and control means. The braking/driving force generation mechanism generates a driving force or a braking force on a wheel of a vehicle. The suspension mechanism couples a wheel arranged at an unsprung position of the vehicle to a body arranged at a sprung position of the vehicle. The control means controls the braking/driving force generation mechanism depending on a behavior generated on the body, thereby generating a predetermined driving force or braking force on the wheel. Then, in the vehicle behavior control apparatus according to the present invention, the behavior generated on the body is controlled by using a vertical force in a vehicle vertical direction acting on the body via the suspension mechanism corresponding to the wheel as a component force of the predetermined driving force or braking force generated on the wheel by the braking/driving force generation mechanism.

On this occasion, for example, the control means can control the braking/driving force generation mechanism depending on the behavior of the body to generate the predetermined driving forces or braking forces on a plurality of the wheels while equalizing the predetermined driving forces or braking forces. Moreover, as the braking/driving force generation mechanism, motors assembled to the respective wheels of the vehicle, for each independently generating the driving force or braking force, may be employed.

According to the present invention, one feature of the vehicle behavior control apparatus resides in that there are provided a fluid pressure cylinder on a fluid pressure supplying side and a fluid pressure cylinder on a fluid pressure supplied side.

The fluid pressure cylinder on the fluid pressure supplying side is arranged between the unsprung position and the sprung position in a neighborhood of the wheel having a margin in the vertical force acting on the body via the suspension mechanism corresponding to the wheel. The fluid pressure cylinder on the fluid pressure supplying side can convert the vertical force acting on the body as the component force of the predetermined driving force or braking force generated by the braking/driving force generation mechanism into a fluid pressure to supply the fluid pressure.

The fluid pressure cylinder on the fluid pressure supplied side is arranged between the unsprung position and the sprung position in a neighborhood of the wheel insufficient in the vertical force acting on the body via the suspension mechanism corresponding to the wheel. The fluid pressure cylinder on the fluid pressure supplied side is connected to the fluid pressure cylinder on the fluid pressure supplying side, and can convert the fluid pressure supplied from the fluid pressure cylinder on the fluid pressure supplying side into the vertical force in the vertical direction of the vehicle to apply the converted vertical force to the body.

With this configuration, for example, in a case where the vertical force acting on the body as the component force of the predetermined driving force or braking force generated on the wheel by the braking/driving force generation mechanism increases owing to a difference in suspension geometry in the suspension mechanism, the fluid pressure cylinder on the fluid pressure supplying side arranged on the side having a margin in the vertical force for controlling the behavior generated on the body can convert the vertical force (in other words, translational force) acting on the body into the fluid pressure to supply the fluid pressure cylinder on the fluid pressure supplied side with the fluid pressure. In other words, for example, in a case where the vertical force acting on the body as the component force of the predetermined driving force or braking force generated on the wheel by the braking/driving force generation mechanism decreases owing to the difference in suspension geometry in the suspension mechanism, the fluid pressure cylinder on the fluid pressure supplying side can supply the converted fluid pressure to the fluid pressure cylinder on the fluid pressure supplied side arranged on the side insufficient in the vertical force (side not having a margin in the vertical force) for controlling the behavior generated on the body.

Thus, the fluid pressure cylinder on the fluid pressure supplied side can receive the fluid pressure supplied from the fluid pressure cylinder on the fluid pressure supplying side to convert the fluid pressure into the vertical force (in other words, translational force) to be applied to the body, and to apply the converted vertical force. Thus, on the side insufficient in the vertical force (side not having a margin in the vertical force) for controlling the behavior generated on the body, in addition to the vertical force acting on the body as the component force of the predetermined driving force or braking force by the braking/driving force generation mechanism, the vertical force acquired by the conversion by the fluid pressure cylinder on the fluid pressure supplied side from the fluid pressure supplied from the fluid pressure cylinder on the fluid pressure supplying side can be applied to the body, thereby eliminating the insufficiency of the vertical force required for controlling the behavior generated on the body. As a result, the behavior generated on the body can be appropriately controlled (the occurrence of the behavior can be assisted or restrained).

Moreover, in order to control the behavior generated on the body only by the driving force or the braking force by the braking/driving force generation mechanism, for example, the braking/driving force generation mechanism needs to generate a larger driving force or braking force on a side originally small in the vertical force acting on the body owing to the suspension geometry in the suspension mechanism, and the braking/driving force generation mechanism needs to generate a smaller driving force or braking force on a side originally large in the vertical force acting on the body owing to the suspension geometry in the suspension mechanism. In contrast, in the vehicle behavior control apparatus according to the present invention, the fluid pressure cylinder on the fluid pressure supplied side can convert the fluid pressure supplied from the fluid pressure cylinder on the fluid pressure supplying side to apply the vertical force on the body.

As a result, the braking/driving force generation mechanism decreases the magnitude of the driving force or the braking force generated on the wheel on the side smaller in the vertical force acting on the vehicle body, whereas the braking/driving force generation mechanism increases the magnitude of the driving force or the braking force generated on the wheel on the side larger in the vertical force acting on the body. In this manner, the fluid pressure cylinder on the fluid pressure supplying side can convert a larger vertical force to supply a lager fluid pressure, and the fluid pressure cylinder on the fluid pressure supplied side can be supplied with the larger fluid pressure, and convert the larger fluid pressure into the larger vertical force to apply the larger vertical force to the body. Thus, for example, the braking/driving force generation mechanism can equalize the magnitudes of the driving forces or the braking forces generated on the respective wheels. As a result, in a case where the braking/driving force generation mechanism is a motor, a total power consumption consumed by the motor can be reduced.

Further, in a case where the fluid pressure cylinder on the fluid pressure supplying side is arranged on one of a front wheel side and a rear wheel side of the vehicle, and the fluid pressure cylinder on the fluid pressure supplied side is arranged on another of the front wheel side and the rear wheel side of the vehicle and is connected to the fluid pressure cylinder on the fluid pressure supplying side, the fluid pressure cylinder on the fluid pressure supplying side can convert the vertical force acting on the one of the front wheel side and the rear wheel side of the body as the component force of the predetermined driving force or braking force into the fluid pressure to supply the fluid pressure cylinder on the fluid pressure supplied side connected thereto with the fluid pressure, and the fluid pressure cylinder on the fluid pressure supplied side can apply the vertical force acquired by converting the fluid pressure supplied from the fluid pressure cylinder on the fluid pressure supplying side to the another of the front wheel side and the rear wheel side of the body.

With this configuration, for example, even in a case where a difference in vertical force is generated by a difference in suspension geometry in the suspension mechanism between the front wheel side and the rear wheel side of the vehicle, the fluid pressure cylinders on the fluid pressure supplying side arranged on the side having a margin in the vertical force (one of the front wheel side and the rear wheel side of the body) supply the fluid pressure cylinders on the fluid pressure supplied side arranged on the side insufficient in vertical force (the another of the front wheel side and the rear wheel side of the body) with the fluid pressures, and hence the fluid pressure cylinders on the fluid pressure supplied side can convert the supplied fluid pressures to apply the vertical forces to the body. Thus, on the side insufficient (smaller side) in vertical force acting on the body as the component force of the predetermined driving force or braking force, the fluid pressure cylinders on the fluid pressure supplied side can apply the vertical pressures converted from the fluid pressures, thereby appropriately controlling, in particular, the behavior generated in the front/rear wheel direction of the body.

Further, in this case, in a case where the fluid pressure cylinders on the fluid pressure supplying side are respectively arranged in neighborhoods of left and right wheels of the one of the front wheel side and the rear wheel side of the vehicle, and the fluid pressure cylinders on the fluid pressure supplied side are respectively arranged in neighborhoods of left and right wheels of the another of the front wheel side and the rear wheel side of the vehicle, the fluid pressure cylinder on the fluid pressure supplying side and the fluid pressure cylinder on the fluid pressure supplied side arranged on the right wheel side of the vehicle can be connected to each other, and the fluid pressure cylinder on the fluid pressure supplying side and the fluid pressure cylinder on the fluid pressure supplied side arranged on the left wheel side of the vehicle can be connected to each other. Moreover, the fluid pressure cylinders on the fluid pressure supplying side arranged on the right wheel side and the left wheel side of the vehicle can respectively convert the vertical forces acting on the right wheel side or the left wheel side of the body as the component forces of the predetermined driving force or braking force into the fluid pressures to supply the fluid pressure cylinders on the fluid pressure supplied side connected thereto with the fluid pressures, and the fluid pressure cylinders on the fluid pressure supplied side arranged on the right wheel side and the left wheel side of the vehicle can respectively apply the vertical forces acquired by converting the fluid pressures supplied from the fluid pressure cylinders on the fluid pressure supplying side to the right wheel side or the left wheel side of the body.

Further, in this case, the fluid pressure cylinder on the fluid pressure supplying side arranged on the right wheel side of the body and the fluid pressure cylinder on the fluid pressure supplied side arranged on the left wheel side of the body, which is thus arranged at a diagonal position, can be connected to each other, and the fluid pressure cylinder on the fluid pressure supplying side arranged on the left wheel side of the body and the fluid pressure cylinder on the fluid pressure supplied side arranged on the right wheel side of the body, which is thus arranged at a diagonal position, can be connected to each other. Moreover, the fluid pressure cylinders on the fluid pressure supplying side arranged on the right wheel side and the left wheel side of the vehicle respectively can convert the vertical forces acting on the right wheel side or the left wheel side of the body as the component forces of the predetermined driving force or braking force into the fluid pressures to supply the fluid pressure cylinders on the fluid pressure supplied side connected thereto, which are arranged at the diagonal positions, with the fluid pressures, and the fluid pressure cylinders on the fluid pressure supplied side arranged on the left wheel side and the right wheel side of the vehicle, which are arranged at the diagonal positions, can respectively apply the vertical forces acquired by converting the fluid pressures supplied from the fluid pressure cylinders on the fluid pressure supplying side to the left wheel side or the right wheel side of the body.

With those configurations, the fluid pressure cylinders on the fluid pressure supplying side arranged on the side having a margin in the vertical force and the fluid pressure cylinders on the fluid pressure supplied side arranged on the side insufficient in the vertical force out of the right wheel side and the left wheel side of the vehicle can be respectively connected to each other independently. Thus, the fluid pressure cylinders on the fluid pressure supplying side supply the fluid pressure cylinders on the fluid pressure supplied side with the fluid pressures independently between the right wheel side and the left wheel side of the vehicle, and hence the fluid pressure cylinders on the fluid pressure supplied side can convert the supplied fluid pressures to apply the vertical forces on the right wheel side and the left wheel side of the body, and can appropriately control, in particular, the behavior generated in the left/right wheel direction of the body.

Further, in those cases, the fluid pressure cylinders on the fluid pressure supplying side arranged in neighborhoods of left and right wheels of one of the front wheel side and the rear wheel side of the vehicle can be connected to each other, and the fluid pressure cylinders on the fluid pressure supplied side arranged in neighborhoods of left and right wheels on another of the front wheel side and the rear wheel side of the vehicle can be connected to each other. Moreover, the fluid pressure cylinders on the fluid pressure supplying side arranged on the right wheel side and the left wheel side of the vehicle and connected to each other can convert the vertical forces acting on the right wheel side or the left wheel side of the body on the one of the front wheel side and the rear wheel side of the vehicle as the component forces of the predetermined driving force or braking force into the fluid pressures to supply the fluid pressure cylinders on the fluid pressure supplied side connected to each other with the fluid pressures, and the fluid pressure cylinders on the fluid pressure supplied side connected to each other respectively can apply the vertical forces acquired by converting the fluid pressures supplied from the fluid pressure cylinders on the fluid pressure supplying side connected to each other to the right wheel side or the left wheel side of the body on the another of the front wheel side and the rear wheel side of the vehicle.

With this configuration, the fluid pressure cylinders on the fluid pressure supplying side arranged on the side having a margin in the vertical force are connected to each other, the fluid pressure cylinders on the fluid pressure supplied side arranged on the side insufficient in the vertical force are connected to each other, and further, the fluid pressure cylinders on the fluid pressure supplying side connected to each other and the fluid pressure cylinders on the fluid pressure supplied side connected to each other can be connected to each other. Thus, the fluid pressure cylinders on the fluid pressure supplying side supply the fluid pressure cylinders on the fluid pressure supplied side with the fluid pressures, and hence the fluid pressure cylinders on the fluid pressure supplied side connected to each other can convert the supplied fluid pressures to apply the vertical forces to the right wheel side and the left wheel side of the body in the same way, and can appropriately stabilize, in particular, the behavior generated in the left/right wheel direction of the body.

Further, another feature of the vehicle behavior control apparatus according to the present invention resides in that: the fluid pressure cylinder on the fluid pressure supplying side includes: a high-pressure-upon-extension chamber for converting the vertical force acting on the body as the component force of the predetermined driving force or braking force into the fluid pressure to supply the fluid pressure when the body displaces toward a vehicle top direction with respect to a road surface owing to the vertical force; and a high-pressure-uponcontraction chamber for converting the vertical force into the fluid pressure to supply the fluid pressure when the body displaces toward a vehicle bottom direction with respect to the road surface owing to the vertical force; the fluid pressure cylinder on the fluid pressure supplied side includes: an extension pressure chamber for converting the fluid pressure supplied from the fluid pressure cylinder on the fluid pressure supplying side into the vertical force for displacing the body toward the vehicle top direction with respect to the road surface; and a contraction pressure chamber for converting the fluid pressure into the vertical force for displacing the body toward the vehicle bottom direction with respect to the road surface; and one of the high-pressure-upon-extension chamber and the high-pressure-upon-contraction chamber included in the fluid pressure cylinder on the fluid pressure supplying side and one of the extension pressure chamber and the contraction pressure chamber included in the fluid pressure cylinder on the fluid pressure supplied side are connected to each other.

With this configuration, one of the high-pressure-upon-extension chamber and the high-pressure-upon-contraction chamber included in the fluid pressure cylinder on the fluid pressure supplying side and one of the extension pressure chamber and the contraction pressure chamber included in the fluid pressure cylinder on the fluid pressure supplied side can be connected to each other. As a result, it is possible to provide the connection forms between the fluid pressure cylinder on the fluid pressure supplying side and the fluid pressure cylinder on the fluid pressure supplied side finely divided depending on the behavior generated on the body. Thus, the behavior generated on the body can be more efficiently and more securely be controlled.

Further, in this case, the vehicle behavior control apparatus can further include connection switching means for selectively connecting or disconnecting the one of the high-pressure-upon-extension chamber and the high-pressure-upon-contraction chamber included in the fluid pressure cylinder on the fluid pressure supplying side and the one of the extension pressure chamber and the contraction pressure chamber included in the fluid pressure cylinder on the fluid pressure supplied side to each other, and the control means can control the connection switching means depending on the behavior generated on the body to connect the fluid pressure cylinder on the fluid pressure supplying side and the fluid pressure cylinder on the fluid pressure supplied side to each other.

Further, it is possible to employ the following connection form as a specific form for connecting the fluid pressure cylinder on the fluid pressure supplying side and the fluid pressure cylinder on the fluid pressure supplied side to each other by the connection switching means. For example, when the independent predetermined driving forces or braking forces are to be generated on a front wheel and a rear wheel of the vehicle via the braking/driving force generation mechanism in order to control such a pitch behavior accompanying a vertical motion generated on the body that a vertical displacement direction on the front wheel side of the body and a vertical displacement direction on the rear wheel side of the body are opposite to each other, the control means controls the connection switching means to connect the high-pressure-upon-extension chamber included in the fluid pressure cylinder on the fluid pressure supplying side and the contraction pressure chamber included in the fluid pressure cylinder on the fluid pressure supplied side to each other, or to connect the high-pressure-upon-contraction chamber included in the fluid pressure cylinder on the fluid pressure supplying side and the extension pressure chamber included in the fluid pressure cylinder on the fluid pressure supplied side to each other.

Further, it is possible to employ the following connection form as another connection form. For example, when the independent predetermined driving forces or braking forces are to be generated on a front wheel and a rear wheel of the vehicle via the braking/driving force generation mechanism in order to control such a heave behavior accompanying a vertical motion generated on the body that a vertical displacement direction on the front wheel side of the body and a vertical displacement direction on the rear wheel side of the body are the same, the control means controls the connection switching means to connect the high-pressure-upon-extension chamber included in the fluid pressure cylinder on the fluid pressure supplying side and the extension pressure chamber included in the fluid pressure cylinder on the fluid pressure supplied side to each other, or to connect the high-pressure-upon-contraction chamber included in the fluid pressure cylinder on the fluid pressure supplying side and the contraction pressure chamber included in the fluid pressure cylinder on the fluid pressure supplied side to each other.

Further, it is possible to employ the following connection form as still another connection form. For example, when the independent predetermined driving forces or braking forces are to be generated on a front wheel and a rear wheel of the vehicle via the braking/driving force generation mechanism in order to control such a roll behavior accompanying a vertical motion generated on the body that a vertical displacement direction on the right wheel side of the body and a vertical displacement direction on the left wheel side of the body are opposite to each other, the control means controls the connection switching means to: connect the high-pressure-upon-extension chamber included in the fluid pressure cylinder on the fluid pressure supplying side and the extension pressure chamber included in the fluid pressure cylinder on the fluid pressure supplied side arranged on the same side out of the left side and the right side of the body to each other, or connect the high-pressure-upon-contraction chamber included in the fluid pressure cylinder on the fluid pressure supplying side and the contraction pressure chamber included in the fluid pressure cylinder on the fluid pressure supplied side arranged on the same side out of the left side and the right side of the body to each other; or connect the high-pressure-upon-extension chamber included in the fluid pressure cylinder on the fluid pressure supplying side and the contraction pressure chamber included in the fluid pressure cylinder on the fluid pressure supplied side arranged on sides opposite to each other out of the left side and the right side of the body to each other, or connect the high-pressure-upon-contraction chamber included in the fluid pressure cylinder on the fluid pressure supplying side and the extension pressure chamber included in the fluid pressure cylinder on the fluid pressure supplied side arranged on sides opposite to each other out of the left side and the right side of the body to each other.

As a result of the employment of the various connection forms, the high-pressure-upon-extension chamber or the high-pressure-upon-contraction chamber of the fluid pressure cylinder on the fluid pressure supplying side and the extension pressure chamber or the contraction pressure chamber of the fluid pressure cylinder on the fluid pressure supplied side can be appropriately selected to be connected to each other depending on a pitch behavior, a heave behavior, and a roll behavior as the behaviors generated on the body. Thus, the pitch behavior, the heave behavior, and the roll behavior generated on the body can be more efficiently and more surely be controlled.

DESCRIPTION OF EMBODIMENT

Figure 1:
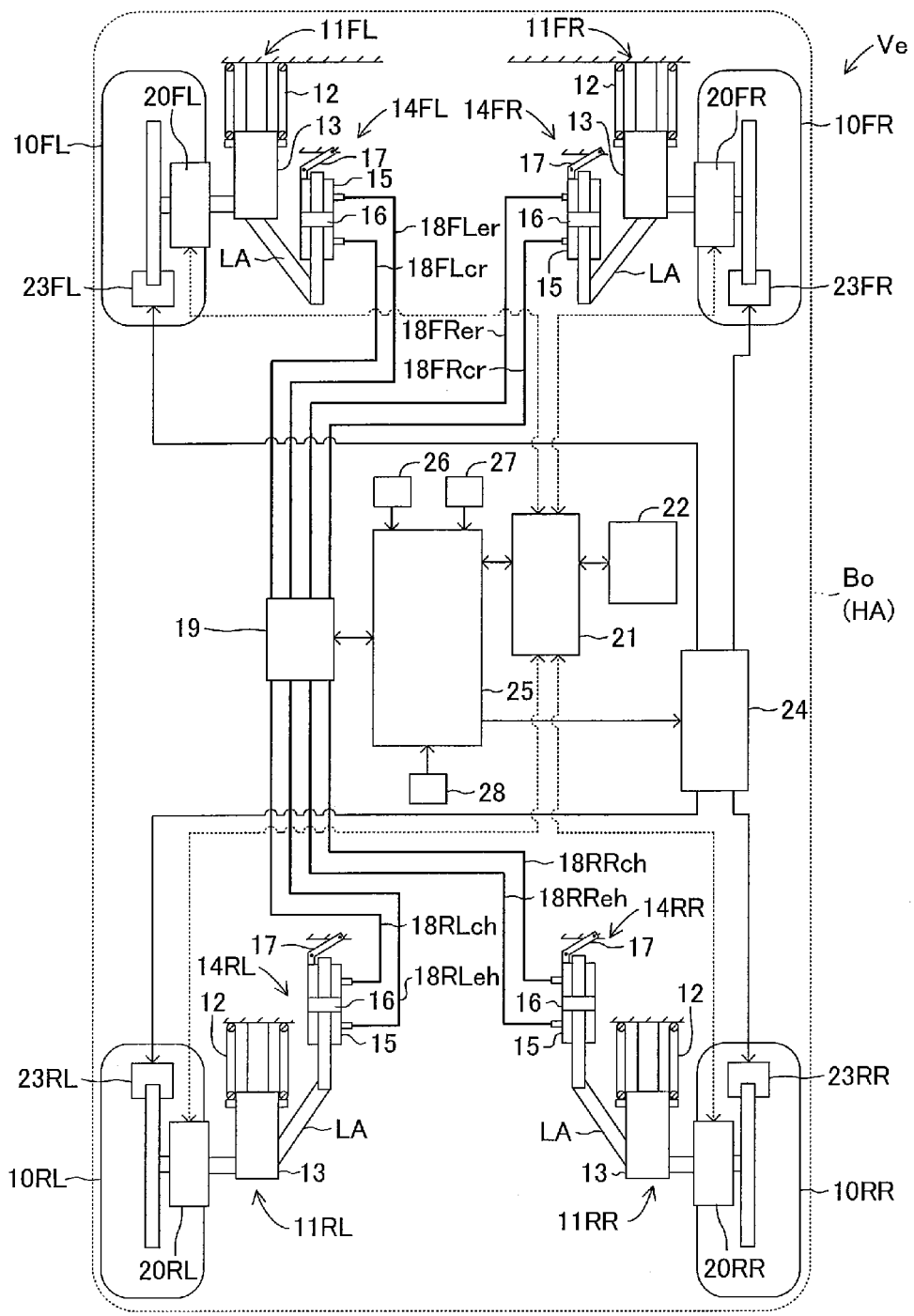
FIG. 1 is a schematic diagram schematically illustrating a configuration of a vehicle to which a vehicle behavior control apparatus according to the present invention can be applied.

A detailed description is now given of a vehicle behavior control apparatus according to an embodiment of the present invention referring to the drawings. FIG. 1 schematically illustrates a configuration of a vehicle Ve on which the vehicle behavior control apparatus according to this embodiment is installed.

The vehicle Ve includes front left and right wheels 10FL and 10FR and rear left and right wheels 10RL and 10RR constructing an unsprung member LA. Then, the front left and right wheels 10FL and 10FR are respectively independently supported via suspension mechanisms 11FL and 11FR by a body Bo constructing a sprung member HA of the vehicle Ve. Moreover, the rear left and right wheels 10RL and 10RR are respectively independently supported via suspension mechanisms 11RL and 11RR by the body Bo (sprung member HA) of the vehicle Ve. The front left and right wheels 10FL and 10FR and the rear left and right wheels 10RL and 10RR are the same in configuration, and thus are hereinafter also simply referred to as wheel 10. Similarly, the suspension mechanisms 11FL, 11FR, 11RL, and 11RR are the same in configuration, and thus are hereinafter also simply referred to as suspension mechanism 11.

As illustrated in FIG. 1, the suspension mechanism 11 includes a suspension spring 12 and a shock absorber 13. First ends (top ends) of the suspension spring 12 and the shock absorber 13 are connected to the body Bo, and the second ends (bottom ends) are connected to the wheel 10 constructing the unsprung member LA. The suspension spring 12 absorbs a vibration transmitted from a road surface via the unsprung member LA including the wheel 10 to the sprung member HA including the body Bo. For example, a metal coil spring or an air spring is employed as the suspension spring 12. Note that, a knuckle, which is coupled to the wheel 10 including a tire, and a suspension link, one end of which is coupled to the knuckle such as a lower arm, correspond to the unsprung member LA. Moreover, the sprung member HA is a member supported by the suspension springs 12 and the shock absorbers 13, and the body Bo is included in the sprung member HA.

The shock absorber 13 is arranged in parallel with the suspension spring 12, and attenuates the vibration from the road surface. Thus, the shock absorber 13 includes a cylinder, a piston, and a piston rod, which are not shown in detail, and generates, as a damping force, a viscous resistance generated when the piston coupled to the sprung member HA via the piston rod moves in a viscous fluid (such as oil) filled inside the cylinder coupled to the unsprung member LA. Note that, for example, a well-known shock absorber capable of changing the viscous resistance stepwise, in other words, capable of changing a magnitude of the damping force (in more detail, damping coefficient) stepwise can be employed as the shock absorber 13.

Moreover, as illustrated in FIG. 1, fluid pressure cylinders 14FL, 14FR, 14RL, and 14RR serving as fluid pressure cylinders on fluid pressure supplying side and fluid pressure cylinders on fluid pressure supplied side according to the present invention are provided between the unsprung member LA including the respective wheels 10 and the sprung member HA including the body Bo. Note that, the fluid pressure cylinders 14FL, 14FR, 14RL, and 14RR are the same in configuration, and thus are hereinafter also simply referred to as fluid pressure cylinder 14.

Figure 2:
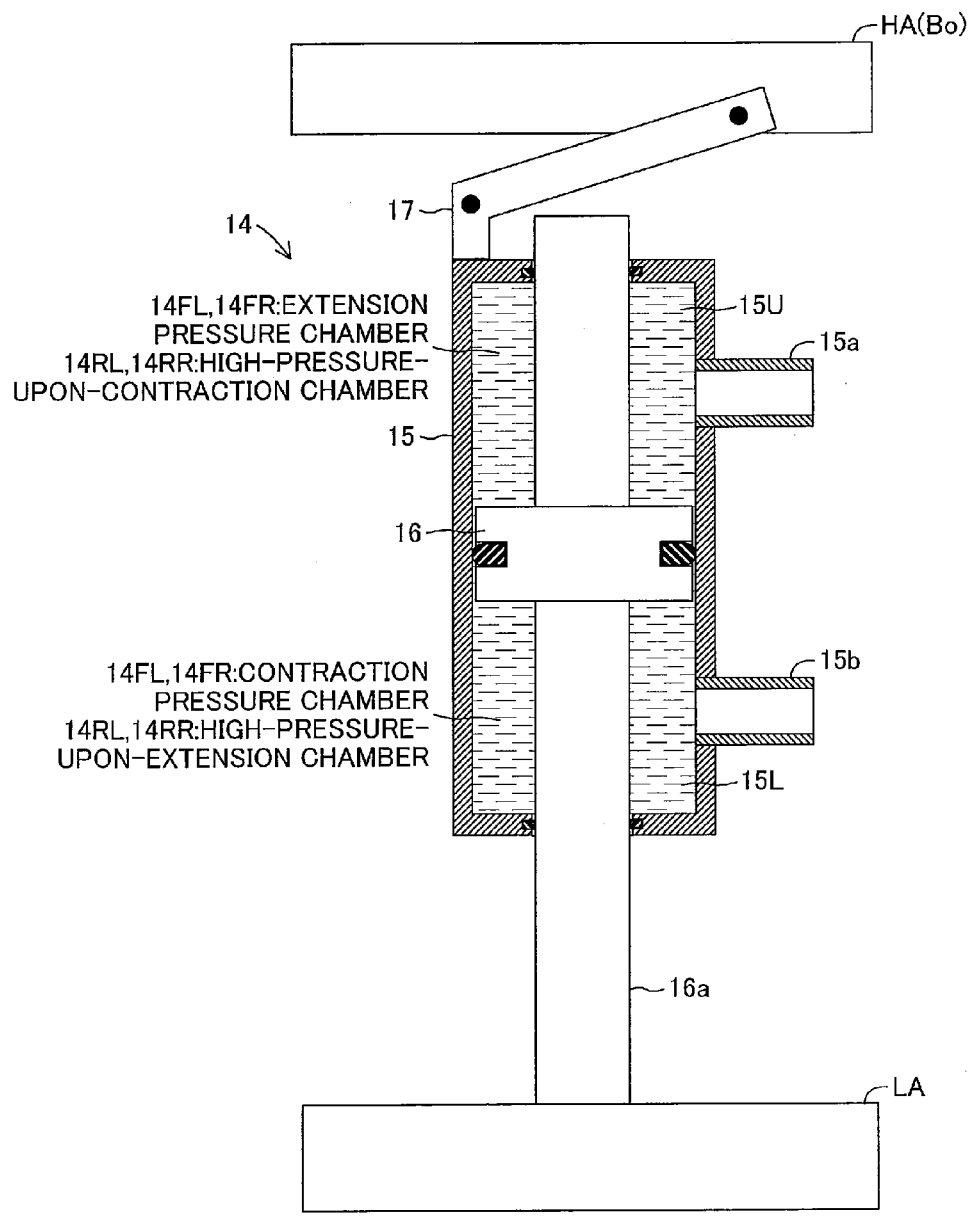
FIG. 2 is a schematic diagram illustrating a configuration of a fluid pressure cylinder of FIG. 1.

As illustrated in FIG. 2, each of the fluid pressure cylinders 14 includes a cylinder tube 15. Further, the cylinder tube 15 stores a piston 16, which separates an inside of the cylinder tube 15 into a cylinder chamber 15U on an upper side and a cylinder chamber 15L on a lower side and can slide in the cylinder tube 15, and, as illustrated in FIG. 2, a piston rod 16a axially extending is integrally assembled to the piston 16. With this, the fluid pressure cylinder 14 is constructed as a double-rod/double-acting fluid pressure cylinder, and a bottom end of the piston rod 16a is assembled to the unsprung member LA (such as the suspension rod) and a top end passes through the cylinder tube to be in a free state. On the other hand, a connection member 17 for a swinging connection to the body Bo (sprung member HA) is assembled to a top end of the cylinder tube 15.

Further, as illustrated in FIG. 2, in the cylinder tube 15, a port 15a communicating to the cylinder chamber 15U on the upper side is provided and a port 15b communicating to the cylinder chamber 15L on the lower side is provided. As illustrated in FIG. 2, the cylinder chamber 15U on the upper side is referred to as extension pressure chamber and the cylinder chamber 15L on the lower side is referred to as contraction chamber in the fluid pressure cylinders 14FL and 14FR provided on the side of the front left and right wheels 10FL and 10FR, and, as illustrated in FIG. 2, the cylinder chamber 15U on the upper side is referred to as high-pressure-upon-contraction chamber and the cylinder chamber 15L on the lower side is referred to as high-pressure-upon-extension chamber in the fluid pressure cylinders 14RL and 14RR provided on the side of the rear left and right wheels 10RL and 10RR, which are described in detail later.

Then, as illustrated in FIG. 1, to the fluid pressure cylinder 14FL, a pipeline 18FLer is connected via the port 15a provided to communicate to the cylinder chamber 15U (extension pressure chamber) on the upper side of the cylinder tube 15, and a pipeline 18FLcr is connected via the port 15b provided to communicate to the cylinder chamber 15L (contraction pressure chamber) on the lower side of the cylinder tube 15. Moreover, as illustrated in FIG. 1, to the fluid pressure cylinder 14FR, a pipeline 18FRer is connected via the port 15a provided to communicate to the cylinder chamber 15U (extension pressure chamber) on the upper side of the cylinder tube 15, and a pipeline 18FRcr is connected via the port 15b provided to communicate to the cylinder chamber 15L (contraction pressure chamber) on the lower side of the cylinder tube 15. These pipelines 18FLer, 18FLcr, 18FRer, and 18FRcr are each connected to a direction control circuit 19.

On the other hand, as illustrated in FIG. 1, to the fluid pressure cylinder 14RL, a pipeline 18RLch is connected via the port 15a provided to communicate to the cylinder chamber 15U (high-pressure-upon-contraction chamber) on the upper side of the cylinder tube 15, and a pipeline 18RLeh is connected via the port 15b provided to communicate to the cylinder chamber 15L (high-pressure-upon-extension chamber) on the lower side of the cylinder tube 15. Moreover, as illustrated in FIG. 1, to the fluid pressure cylinder 14RR, a pipeline 18RRch is connected via the port 15a provided to communicate to the cylinder chamber 15U (high-pressure-upon-contraction chamber) on the upper side of the cylinder tube 15, and a pipeline 18RReh is connected via the port 15b provided to communicate to the cylinder chamber 15L (high-pressure-upon-extension chamber) on the lower side of the cylinder tube 15. These pipelines 18RLch, 18RLeh, 18RRch, and 18RReh are each connected to the direction control circuit 19.

Note that, the pipelines 18FLer, 18FLcr, 18FRer, 18FRcr, 18RLch, 18RLeh, 18RRch, and 18RReh are the same in configuration, and may thus be hereinafter also simply referred to as pipeline 18.

The direction control circuit 19 is constructed by combining a plurality of widely-known direction control valves and other control valves, accumulators, reservoir tanks, and the like, and, as described later, applies control by switching connection/disconnection between the pipelines 18FLer, 18FLcr, 18FRer, and 18FRcr connected to the fluid pressure cylinders 14FL and 14FR provided on the side of the front left and right wheels 10FL and 10FR, and the pipelines 18RLch, 18RLeh, 18RRch, and 18RReh connected to the fluid pressure cylinders 14RL and 14RR provided on the side of the rear left and right wheels 10RL and 10RR. Any structure and control content may be employed and embodied for a structure of the plurality of direction control valves constructing the direction control circuit 19 and control contents of the individual direction control valves, and a description thereof is therefore omitted.

Moreover, as illustrated in FIG. 1, in-wheel motors 20FL, 20FR, 20RL, and 20RR constructing the unsprung member LA of the vehicle Ve are built into the respective wheels 10, and are respectively coupled to the front left and right wheels 10FL and 10FR and the rear left and right wheels 10RL and 10RR for power transmission. The in-wheel motors 20FL, 20FR, 20RL, and 20RR are the same in configuration, and thus are hereinafter also simply referred to as in-wheel motor 20. Further, driving forces and braking forces to be generated on the front left and right wheels 10FL and 10FR and the rear left and right wheels 10RL and 10RR can be independently controlled by independently controlling rotations of the respective in-wheel motors 20FL, 20FR, 20RL, and 20RR.

Each of the in-wheel motors 20 is constructed of, for example, an AC synchronous motor. Further, a DC electric power of a power storage device 22 such as a battery or a capacitor is converted via an inverter 21 to an AC electric power, and the AC electric power is fed to each of the in-wheel motors 20. With this, the respective in-wheel motors 20 are controlled by driving control (so-called power running control), thereby imparting driving forces to the front left and right wheels 10FL and 10FR and the rear left and right wheels 10RL and 10RR.

Moreover, regeneration control can be applied to the respective in-wheel motors 20 by using rotation energy of the front left and right wheels 10FL and 10FR and the rear left and right wheels 10RL and 10RR. With this, when the respective in-wheel motors 20 are used for the regeneration/electric power generation, the rotational (kinetic) energies of the front left and right wheels 10FL and 10FR and the rear left and right wheels 10RL and 10RR are converted by the respective in-wheel motors 20 into electric energies, and electric power (so-called regenerative electric power) as a result of the conversion is accumulated in the power storage device 22 via the inverter 21. On this occasion, the respective in-wheel motors 20 impart braking forces based on the regenerative power generation to the front left and right wheels 10FL and 10FR and the rear left and right wheels 10RL and 10RR.

Further, each of brake mechanisms 23FL, 23FR, 23RL, and 23RR is provided between the wheel 10 and the corresponding in-wheel motor 20. The same publicly-known configuration such as the disk brake or the drum brake can be employed as the brake mechanism 23FL, 23FR, 23RL, and 23RR, and are hereinafter also referred to as brake mechanism 23. The brake mechanism 23, for example, is connected to a brake actuator 24 for operating a piston of a brake caliper and a brake shoe (both are not shown) for generating the braking force on each of the wheels 10 by means of a hydraulic pressure pressure-fed from, for example, a master cylinder (not shown).

The direction control circuit 19, the inverter 21, and the brake actuator 24 are each connected to an electronic control unit 25 for controlling the switching of the respective pipelines 18 connecting between the respective fluid pressure cylinders 14, the rotational state of the respective in-wheel motors 20, and the operation states of the brake mechanisms 23. Thus, the direction control circuit 19 and the respective pipelines 18 correspond to connection switching means according to the present invention, each of the in-wheel motors 20, the inverter 21, the power storage device 22, the brake mechanism 23, and the brake actuator 24 correspond to a braking/driving force generation mechanism according to the present invention, and the electronic control unit 25 corresponds to control means according to the present invention.

The electronic control unit 25 has a microcomputer constructed of a CPU, a ROM, a RAM, and the like as main components, and executes various programs to control operations of the direction control circuit 19, the respective in-wheel motors 20, and the respective brake mechanisms 23. Therefore, respective signals from various sensors including an operation state detection sensor 26 as operation state detection means for detecting a state of an operation by a driver for traveling the vehicle Ve, a motion state detection sensor 27 as motion state detection means for detecting a motion state generated on the body Bo (sprung member HA) of the traveling vehicle Ve, an interference detection sensor 28 for detecting interference acting on the traveling vehicle Ve, and signals from the inverter are input to the electronic control unit 25.

On this occasion, the operation state detection sensor 26 is constructed of, for example, a steering angle sensor for detecting an operation amount (steering angle) by the driver on a steering wheel (not shown), an accelerator sensor for detecting operation amounts (such as a depressed amount, an angle, and a pressure) by the driver on an accelerator pedal (not shown), a brake sensor for detecting operation amounts (such as a depressed amount, an angle, and a pressure) by the driver on a brake pedal (not shown), and the like. Moreover, the motion state detection sensor 27 is constructed of, for example, a sprung vertical acceleration sensor for detecting a vertical acceleration of the body Bo (sprung member HA) in the vertical direction, a lateral acceleration sensor for detecting a lateral acceleration of the body Bo in the lateral direction, a vehicle speed sensor for detecting a vehicle speed of the body Bo (vehicle Ve), a pitch rate sensor for detecting a pitch rate generated on the body Bo, a roll rate sensor for detecting a roll rate generated on the body Bo, a yaw rate sensor for detecting a yaw rate generated on the vehicle Ve, and the like. Further, the interference detection sensor 28 is constructed of, for example, stroke sensors each for detecting a stroke amount of each of the suspension mechanisms 11, unsprung vertical acceleration sensors each for detecting a vertical acceleration in the vertical direction of the unsprung member LA of the vehicle Ve including each wheel 10, and the like.

The sensors 26 to 28 and the inverter 21 are connected to the electronic control unit 25 and the respective signals are input thereto in this way, and the electronic control unit 25 can thus recognize and control the travel state of the vehicle Ve and the behavior of the body Bo.

A specific description is first given of the control of the travel state of the vehicle Ve. Based on the signals input from the operation state detection sensor 26, for example, when the driver is operating the accelerator pedal, the electronic control unit 25 can calculate required driving forces corresponding to the accelerator operation amount caused by the operation, namely, driving forces which the respective wheels 10 is required to generate by using the respective in-wheel motors 20 in order to accelerate the vehicle Ve. Moreover, based on the signals input from the operation state detection sensor 26, for example, when the driver is operating the brake pedal, the electronic control unit 25 can calculate required braking forces corresponding to the brake operation amount caused by the operation, namely, braking forces which the respective in-wheel motors 20 and the respective brake mechanisms 23 are required to cooperate to generate on the respective wheels 10 in order to decelerate the vehicle Ve.

Then, based on the signals input from the inverter 21, specifically, signals indicating electric energies and current values supplied to the respective in-wheel motors 20 during the power running control and signals indicating electric energies and current values regenerated from the respective in-wheel motors 20 during the regeneration control, the electronic control unit 25 controls the respective in-wheel motors 20 to generate output torques (motor torques) corresponding to the required driving forces, and controls the respective in-wheel motors 20 to generate output torques (motor torques) corresponding to the required braking forces.

In this manner, the electronic control unit 25 can output signals for applying the power running control or the regeneration control to the rotations of the respective in-wheel motors 20 via the inverter 21 and signals for respectively controlling the operations of the respective brake mechanisms 23 via the brake actuator 24. Thus, the electronic control unit 25 acquires the required driving force and the required braking force required for the vehicle Ve based on the input signals from at least the operation state detection sensor 26, and outputs the signals for respectively controlling the power running/regeneration states of the respective in-wheel motors 20, and the operations of the brake actuator 24, namely, the respective brake mechanisms 23 so as to generate the required driving force and the required braking force, thereby controlling the travel state of the vehicle Ve.

On the other hand, the electronic control unit 25 can control the behavior of the body Bo (vehicle Ve) based on the signals input from the operation state detection sensor 26, the motion state detection sensor 27, and the interference detection sensor 28. A detailed description is now given of the behavior control of the body Bo.

When the electronic control unit 25 controls the behavior of the body Bo (vehicle Ve), the electronic control unit 25 controls the respective in-wheel motors 20 and the respective brake mechanisms 23 to cooperate to each other, thereby independently controlling the driving force and the braking force (the driving force and the braking force are hereinafter together also referred to as braking/driving force) generated by each of the wheels 10. As a result, the electronic control unit 26 can control, for example, a yaw motion to control the vehicle Ve to appropriately travel, and can control a pitch behavior, a heave behavior, and a roll behavior as behaviors generated on the vehicle Bo (vehicle Ve). In other words, the electronic control unit 25 uses the respective signals input from the operation state detection sensor 26, the motion state detection sensor 27, and the interference detection sensor 28 to calculate a target longitudinal driving force, a target yaw moment, a target pitch moment, a target heave force, and a target roll moment. The signals input from the operation state detection sensor 26 include the steering angle of the steering wheel, the accelerator operation amount caused by the operation on the accelerator pedal, and the brake operation amount caused by the operation on the brake pedal. The signals input from the motion state detection sensor 27 include the vehicle speed and the yaw rate of the vehicle Ve, the pitch rate and the roll rate of the body Bo, and the sprung vertical acceleration. The signals input from the interference detection sensor 28 include the unsprung vertical accelerations of the vehicle Ve caused by passage over a bump and a magnitude of influence of a cross wind.

Figure 3:
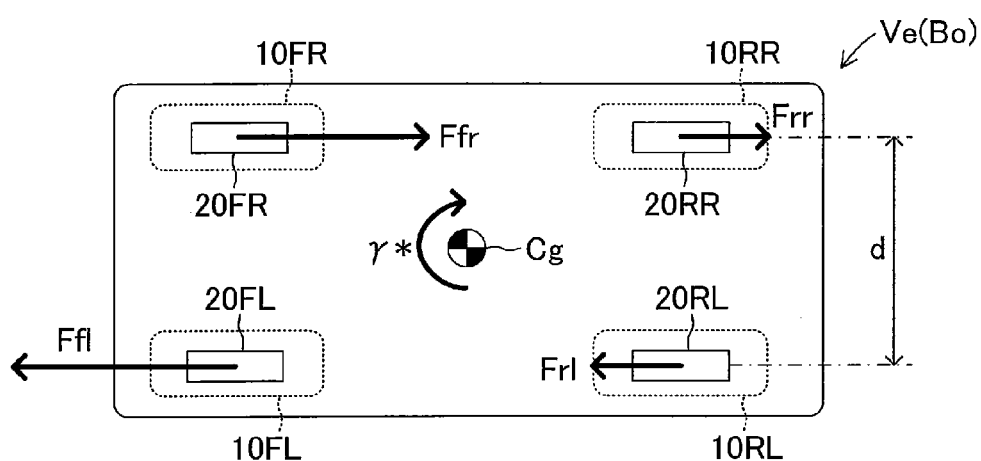
FIG. 3 is a diagram illustrating magnitudes of forces generated on respective wheels by respective in-wheel motors when yaw control is applied to the vehicle of FIG. 1 and a behavior of a body is controlled.

Then, the electronic control unit 25 calculates respective braking/driving forces for generating the calculated target longitudinal driving force on the respective wheels 10, and calculates respective braking/driving forces to be generated on the respective wheels 10 for generating the target yaw moment, the target pitch moment, the target heave force, and the target roll moment, for example, at a position of the center of gravity Cg of the vehicle Ve. Specifically, as illustrated in FIG. 3, when, for example, a target yaw moment γ* is to be generated, the electronic control unit 25 distributes the required driving force or the required braking force to the respective wheels 10, thereby calculating a front left braking/driving force Ffl to be generated by the in-wheel motor 20FL on the front left wheel 10FL, a front right braking/driving force Ffr to be generated by the in-wheel motor 20FR on the front right wheel 10FR, a rear left braking/driving force Frl to be generated by the in-wheel motor 20RL on the rear left wheel 10RL, and a rear right braking/driving force Frr to be generated by the in-wheel motor 20RR on the rear right wheel 10RR. In this manner, the electronic control unit 25 can restrain a yaw motion to control the vehicle Ve to appropriately travel, and can use a vertical force acting on (input to) the body Bo caused by the braking/driving forces Ffl, Ffr, Frl, and Frr to be generated on the respective wheels 10 to control the pitch behavior, the heave behavior, and the roll behavior generated on the body Bo.

Figure 4:
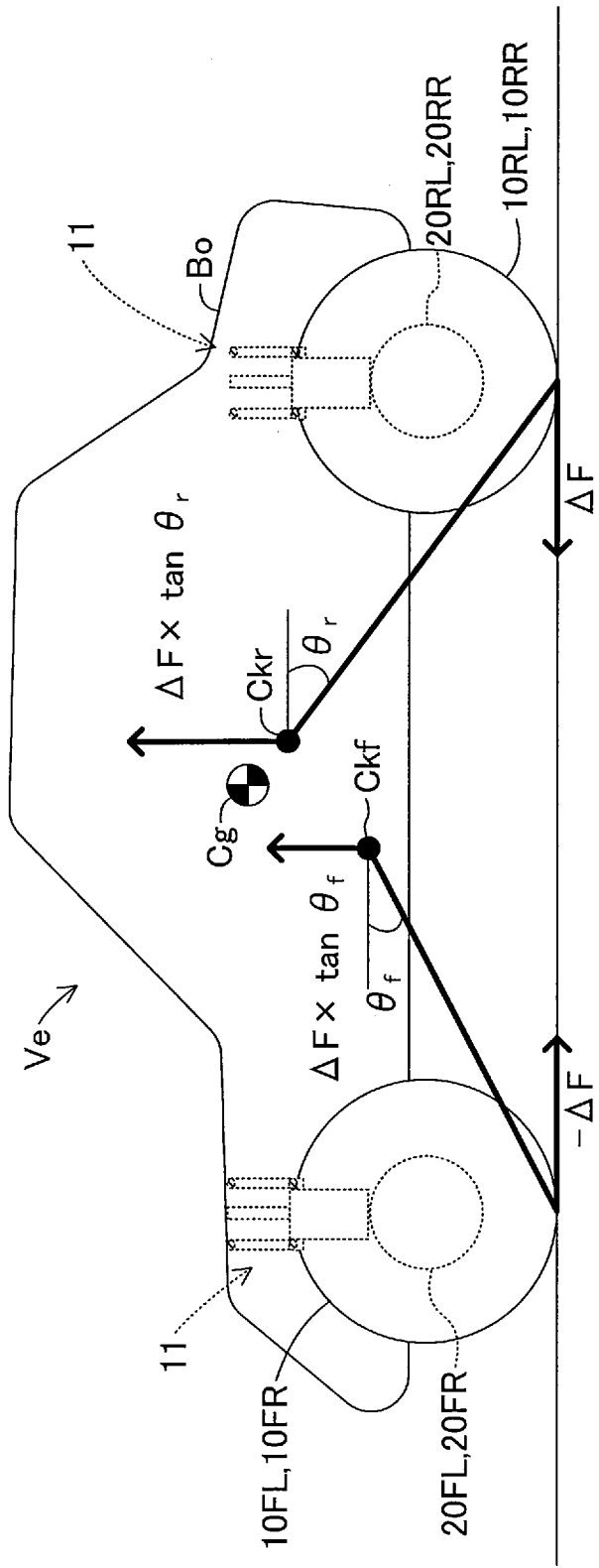
FIG. 4 is a diagram illustrating a state in which a magnitude of a vertical force acting on the body as a component force of a braking/driving force generated on each wheel by the each in-wheel motor is different owing to a difference in suspension geometry in a suspension mechanism.

By the way, on the vehicle Ve, in general, owing to a difference in an arrangement of the suspension mechanism 11, namely, so-called suspension geometry between the front wheel side and the rear wheel side, suspension characteristics are different therebetween. Thus, a magnitude of vertical forces acting on (input into) the body Bo (sprung member HA) caused by the braking/driving forces Ffl and Ffr generated by the front left and right wheels 10FL and 10FR differs from a magnitude of vertical forces acting on (input into) the body Bo (sprung member HA) caused by the braking/driving forces Frl and Frr generated by the rear left and right wheels 10RL and 10RR. Referring to FIG. 4, a specific description is now given of the state.

As schematically illustrated in FIG. 4, such a state is now assumed that, owing to the difference in the suspension geometry between the front wheel side and the rear wheel side of the vehicle Ve, an instantaneous rotation angle is θf (estimated value) at an instantaneous rotation center Ckf of the suspension mechanisms 11FL and 11FR of the front left and right wheels 10FL and 10FR, an instantaneous rotation angle is θr (estimated value) at an instantaneous rotation center Ckr of the suspension mechanisms 11RL and 11RR of the rear left and right wheels 10RL and 10RR, and the instantaneous rotation angle θr on the rear wheel side is larger than the instantaneous rotation angle θf on the front wheel side. The suspension geometries are generally set so that the instantaneous rotation angle θr on the rear wheel side is larger than the instantaneous rotation angle θf on the front wheel side on the vehicle Ve in consideration of ride comfort, braking/driving attitudes, and the like, but it should be understood that the suspension geometry may be set so that the instantaneous rotation angle θf on the front wheel side is larger than the instantaneous rotation angle θr on the rear wheel side.

Under this state, as illustrated in FIG. 4, the following case is assumed. The front left and right wheels 10FL and 10FR generate the front right braking/driving force Ffr and the rear left braking/driving force Frl acting as braking forces with respect to the rear left and right wheels 10RL and 10RR and the rear left and right wheels 10RL and 10RR generate the rear left braking/driving force Frl and the rear right braking/driving force Frr acting as driving forces with respect to the front left and right wheels 10FL and 10FR, in other words, a braking/driving force ΔF in the longitudinal direction is generated between the front left and right wheels 10FL and 10FR and the rear left and right wheels 10RL and 10RR. In this case, as illustrated in FIG. 4, a component force in the vertical direction of the braking/driving force ΔF acting on the body Bo from the side of the front left and right wheels 10FL and 10FR is represented by using the instantaneous rotation angle θf of the suspension mechanisms 11FL and 11FR as ΔF×tan θf acting upward with respect to the vehicle Ve, and a component force in the vertical direction of the braking/driving force ΔF acting on the body Bo from the side of the rear left and right wheels 10RL and 10RR is represented by using the instantaneous central angle θr of the suspension mechanisms 11RL and 11RR as ΔF×tan θr acting upward with respect to the vehicle Ve. In a case where the front left and right wheels 10FL and 10FR generate the front right braking/driving force Ffr and the rear left braking/driving force Frl acting as the driving forces with respect to the rear left and right wheels 10RL and 10RR, and the rear left and right wheels 10RL and 10RR generate the rear left braking/driving force Frl and the rear right braking/driving force Frr acting as the braking forces with respect to the front left and right wheels 10FL and 10FR, ΔF×tan θf acts downward with respect to the vehicle Ve and ΔF×tan θr acts downward with respect to the vehicle Ve.

Thus, in a case where the suspension geometry is set so that the magnitude of the instantaneous central angle θr of the suspension mechanisms 11RL and 11RR is larger than the magnitude of the instantaneous central angle θf of the suspension mechanisms 11FL and 11FR, as illustrated in FIG. 4, the vertical force ΔF×tan θr caused by the rear left braking/driving force Frl and the rear right braking/driving force Frr generated on the rear left and right wheels 10RL and 10RR, and acting on the body Bo is larger than the vertical force ΔF×tan θf caused by the front left braking/driving force Ffl and the front right braking/driving force Ffr generated on the front left and right wheels 10FL and 10FR, and acting on the body Bo. As a result, on this occasion, when the electronic control unit 25 appropriately controls the generation direction and magnitude of the motor torque generated via the inverter 21 on each of the in-wheel motors 20, in other words, appropriately changes the driving/braking force generated on each of the wheels 10 to control the behavior of the body Bo by the vertical force ΔF×tan θf and the vertical force ΔF×tan θr acting thereon, the electronic control unit 25 controls the behavior of the body Bo based on the magnitude of the vertical force ΔF×tan θf acting on the body Bo caused by the front left braking/driving force Ffl and the front right braking/driving force Ffr generated on the front left and right wheels 10FL and 10FR, namely, the magnitude of the smaller vertical force ΔF×tan θf.

In other words, specifically, when a state illustrated in FIG. 3 in which the yaw behavior is controlled is exemplified for description, in order to prevent the pitch behavior and the heave behavior from being generated on the body Bo as the yaw behavior is controlled, in other words, in order to prevent an acceleration from being generated in the pitch (heave) direction, a sum of the front left braking/driving force Ffl (positive value) to be generated on the front left wheel 10FL and the front right braking/driving force Ffr (negative value) to be generated on the front right wheel 10FR needs to be "0", and a sum of the rear left braking/driving force Erl (positive value) to be generated on the rear left wheel 10RL and the rear right braking/driving force Frr (negative value) to be generated on the rear right wheel 10RR needs to be "0". In other words, Ffl+Ffr=0 and Frl+Frr=0, and thus, the front left and right braking/driving forces can be represented as Ffl=Ff and Ffr=−Ff by using the braking/driving force Ff to be generated on the front left and right wheels 10FL and 10FR of the vehicle Ve, and the rear left and right braking/driving forces can be represented as Frl=Fr and Frr=−Fr by using the braking/driving force Fr to be generated on the rear left and right wheels 10RL and 10RR of the vehicle Ve.

Moreover, in FIG. 3, in order to prevent the roll behavior from being generated on the body Bo as the yaw behavior is controlled, in other words, in order to prevent a roll moment from being generated, a relationship Ff×tan θfxd+Fr×tan θr×d=0 needs to hold true. As a result, Ff can be represented as tan θr/tan θf×Fr, and thus, in order to apply the same vertical forces in magnitude on the body Bo, the braking/driving force Ff generated by the side of the front left and right wheels 10FL and 10FR needs to be tan θr/tan θf times as large as the braking/driving force Fr generated by the side of the rear left and right wheels 10RL and 10RR. Thus, the electronic control unit 25 controls the behavior of the body Bo based on the magnitude of the smaller vertical force, in other words, controls the behavior of the body Bo while a margin remains on the side generating the larger vertical force. Then, if an uneven distribution is generated in the braking/driving force in this way, the side generating the smaller vertical force always needs to output a large braking/driving force, resulting in increase in the electric power consumption. Thus, when the behavior of the body Bo (vehicle Ve) is controlled by controlling the braking/driving forces generated by the respective wheels 10, in other words, controlling the motor torques generated by the respective in-wheel motors 20, it is desired that the braking/driving forces (motor torque) generated by the respective wheels 10 be distributed and equalized without the generation of the bias in the braking/driving force.

Thus, in the vehicle behavior control apparatus according to the present invention, for the side smaller in the vertical force acting on the body Bo (sprung member HA), in other words, the side insufficient in the vertical force required for controlling the behavior of the body Bo, when the same braking/driving forces in magnitude are generated on the respective wheels 10, the side larger in the vertical force acting on the body Bo (sprung member HA), in other words, the side having a margin in the vertical force required for controlling the behavior of the body Bo assists the generation of the vertical forces. Specifically, in this embodiment in which the above-mentioned suspension geometry is set, the magnitude of the vertical forces acting on the body Bo (sprung member HA) from the front left and right wheels 10FL and 10FR side is small, and the magnitude of the vertical forces acting on the body Bo (sprung member HA) from the rear left and right wheels 10RL and 10RR side is large. Thus, in this embodiment, the side of the front left and right wheels 10FL and 10FR is the side insufficient in the vertical force required for controlling the behavior of the body Bo, and the side of the rear left and right wheels 10RL and 10RR is the side having a margin in the vertical force required for controlling the behavior of the body Bo. It should be understood that even in a case where the above-mentioned suspension geometry is set, depending on the state of the control of the behavior of the body Bo, there may exist such a state that the side of the front left and right wheels 10FL and 10FR is the side having a margin in the vertical force required for controlling the behavior of the body Bo, and the side of the rear left and right wheels 10RL and 10RR is the side insufficient in the vertical force required for controlling the behavior of the body Bo.

Figure 5:
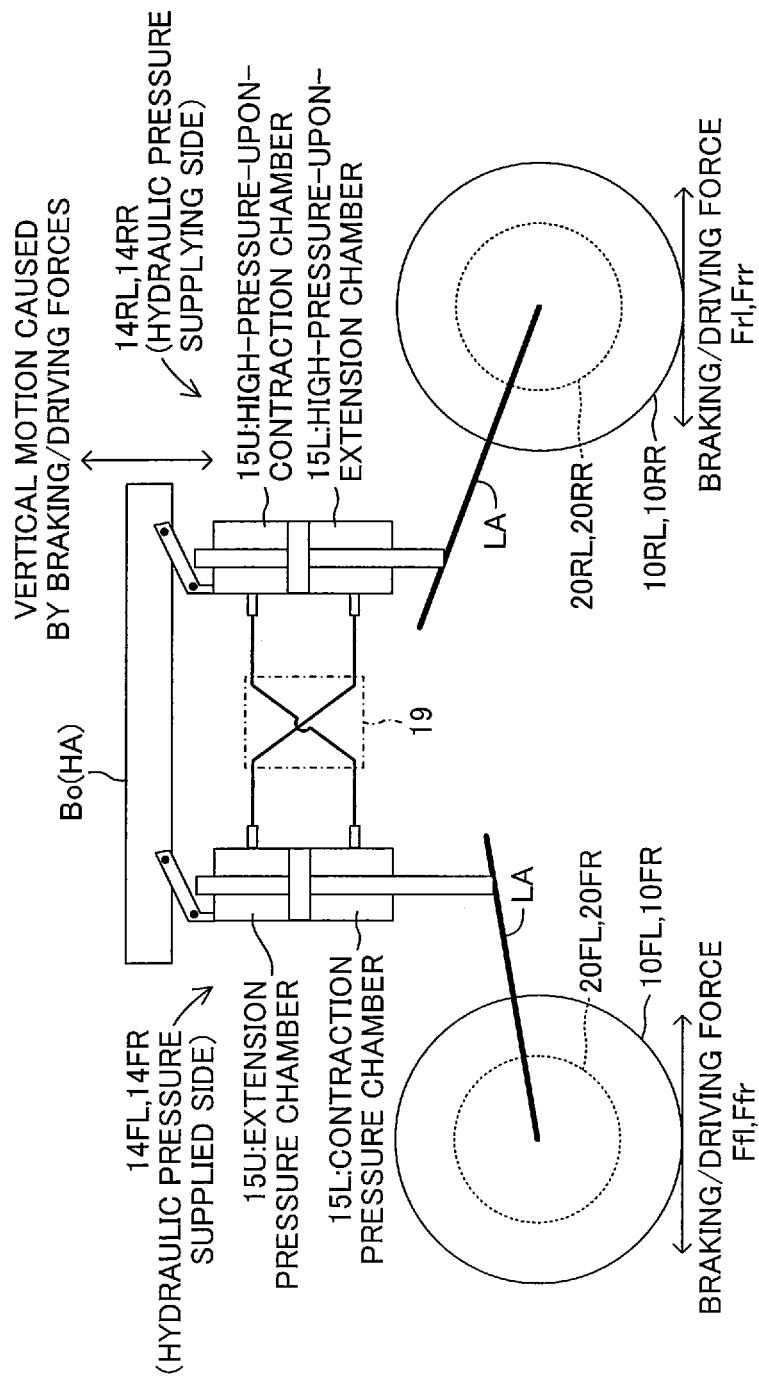
FIG. 5 is a schematic diagram illustrating operations of the fluid pressure cylinders in the vehicle behavior control apparatus according to an embodiment of the present invention.

By the way, as schematically illustrated in FIG. 5, the side of the rear left and right wheels 10RL and 10RR having a margin in the vertical force is large in the instantaneous rotation angle θr, and can thus increase the braking/driving forces Frl and Frr, namely, the motor torques generated by the in-wheel motors 20RL and 20RR, thereby increasing the vertical forces acting on the body Bo. In this manner, the rear left and right wheels 10RL and 10RR can actively move the body Bo (sprung member HA) in the vertical direction. On this occasion, on the side of the rear left and right wheels 10RL and 10RR, the fluid pressure cylinders 14RL and 14RR arranged between the body Bo (sprung member HA) and the unsprung member LA are actively extended and contracted in response to an increase/decrease in the braking/driving forces Frl and Frr, in other words, in response to the vertical motion of the body Bo. As a result, in the fluid pressure cylinders 14RL and 14RR, the cylinder chambers 15U on the upper side are compressed to have a higher pressure (high-pressure-upon-contraction chambers) as the body Bo is displaced downward (displaced toward a compressed direction), and the cylinder chambers 15L on the lower side have a higher pressure (high-pressure-upon-extension chambers) as the body Bo is displaced upward (displaced toward an extension direction).

In other words, in this embodiment, the fluid pressure cylinders 14FL and 14FR arranged on the side of the rear left and right wheels 10RL and 10RR having a margin in the vertical force are fluid pressure cylinders on a fluid pressure supplying side, and can function as so-called pumps for supplying the high hydraulic pressures, which convert the vertical forces (translational forces) of the body Bo (sprung member HA) generated by the braking/driving forces Frl and Frr (motor torques of the in-wheel motors 20FL and 20FR) of the rear left and right wheels 10RL and 10RR into the high hydraulic pressures to output the high hydraulic pressures. On the other hand, in this embodiment, the fluid pressure cylinders 14RL and 14RR arranged on the side of the front left and right wheels 10FL and 10FR insufficient in the vertical force are fluid pressure cylinders on a fluid pressure supplied side, and can function as so-called actuators driven by the high hydraulic pressures, which are supplied with the converted high hydraulic pressures from the fluid pressure cylinders 14FL and 14FR arranged on the side of the rear left and right wheels 10RL and 10RR having a margin in the vertical force to convert the supplied hydraulic pressures (high pressures) into vertical forces (translational forces) input to the body Bo (sprung member HA). In the following description given in this embodiment, the fluid pressure cylinders 14RL and 14RR may be referred to as the fluid pressure cylinders 14 on the hydraulic pressure supplying side, and the fluid pressure cylinders 14FL and 14FR may be referred to as the fluid pressure cylinders 14 on the hydraulic pressure supplied side.

Therefore, for example, when the body Bo needs to be displaced upward on the side of the front left and right wheels 10FL and 10FR insufficient in vertical force, in other words, the body Bo needs to be displaced toward the extension direction, for example, as illustrated in FIG. 5, the cylinder chambers 15L (high-pressure-upon-extension chambers) on the lower side of the fluid pressure cylinders 14RL and 14RR on the hydraulic pressure supplying side, which become high in pressure as the body Bo displaces toward the extension direction, and the cylinder chambers 15U (extension pressure chambers) on the upper side of the fluid pressure cylinders 14FL and 14FR on the hydraulic pressure supplied side are controlled to communicate to each other via the direction control circuit 19. In this manner, the hydraulic pressures (high pressures) can be supplied from the high-pressure-upon-extension chambers of the fluid pressure cylinders 14RL and 14RR to the extension pressure chambers 15U of the fluid pressure cylinders 14FL and 14FR, and the fluid pressure cylinders 14FL and 14FR can convert the hydraulic pressures supplied to the extinction pressure chambers 15U into translational forces for the active extension. Then, the fluid pressure cylinders 14FL and 14FR can apply the translational forces caused by the extension operation, namely, the vertical forces to the body Bo, thereby displacing the side of the front left and right wheels 10FL and 10FR upward.

Conversely, for example, when the body Bo needs to be displaced downward on the side of the front left and right wheels 10FL and 10FR insufficient in vertical force, in other words, the body Bo needs to be displaced toward the contraction direction, for example, as illustrated in FIG. 5, the cylinder chambers 15U (high-pressure-upon-contraction chambers) on the upper side of the fluid pressure cylinders 14RL and 14RR on the hydraulic pressure supplying side, which become high in pressure as the body Bo displaces toward the contraction direction, and the cylinder chambers 15L (contraction pressure chambers) on the lower side of the fluid pressure cylinders 14FL and 14FR on the hydraulic pressure supplied side are controlled to communicate to each other via the direction control circuit 19. In this manner, the hydraulic pressures (high pressures) can be supplied from the high-pressure-upon-contraction chambers of the fluid pressure cylinders 14RL and 14RR to the contraction pressure chambers 15L of the fluid pressure cylinders 14FL and 14FR, and the fluid pressure cylinders 14FL and 14FR can convert the hydraulic pressures supplied to the contraction pressure chambers 15L into translational forces for the active contraction. Then, the fluid pressure cylinders 14FL and 14FR can apply the translational forces caused by the contraction operation, namely, the vertical forces to the body Bo, thereby displacing the side of the front left and right wheels 10FL and 10FR downward.

Moreover, the hydraulic pressures (high pressures) are supplied from the fluid pressure cylinders 14RL and 14RR on the hydraulic pressure supplying side to the fluid pressure cylinders 14FL and 14FR on the hydraulic pressure supplied side and the fluid pressure cylinders 14FL and 14FR convert the supplied hydraulic pressures to apply (input) the vertical forces on the body Bo (sprung member HA), and thus the magnitudes of the braking forces Ffl and Ffr to be generated on the front left and right wheels 10FL and 10FR can be decreased (the motor torques of the in-wheel motors 20FL and 20FR can be reduced) while the braking/driving forces Frl and Frr to be generated on the rear left and right wheels 10RL and 10RR can be increased (the motor torques of the in-wheel motors 20FL and 20FR can be increased). In this manner, the braking/driving forces Ffl, Ffr, Frl, and Frr generated by the respective wheels 10 (motor torques generated by the respective in-wheel motors 20) can be, for example, evenly distributed, in other words, can be distributed equally for equalization.

In the vehicle behavior control apparatus according to the present invention, the braking/driving forces generated on the respective wheels 10 can be controlled to control the behavior of the body Bo constructing the sprung member HA, and based on the behavior of the body Bo, the electronic control unit 25 can also appropriately change the connection forms between the fluid pressure cylinders 14RL and 14RR on the hydraulic pressure supplying side and the fluid pressure cylinders 14FL and 14FR on the hydraulic pressure supplied side via the pipelines 18 and the direction control circuit 19, thereby appropriately controlling the behavior of the body Bo. A specific description is now given of the behavior control of the body Bo by changing the connection form.

(1) Connection Form 1

Figure 6:
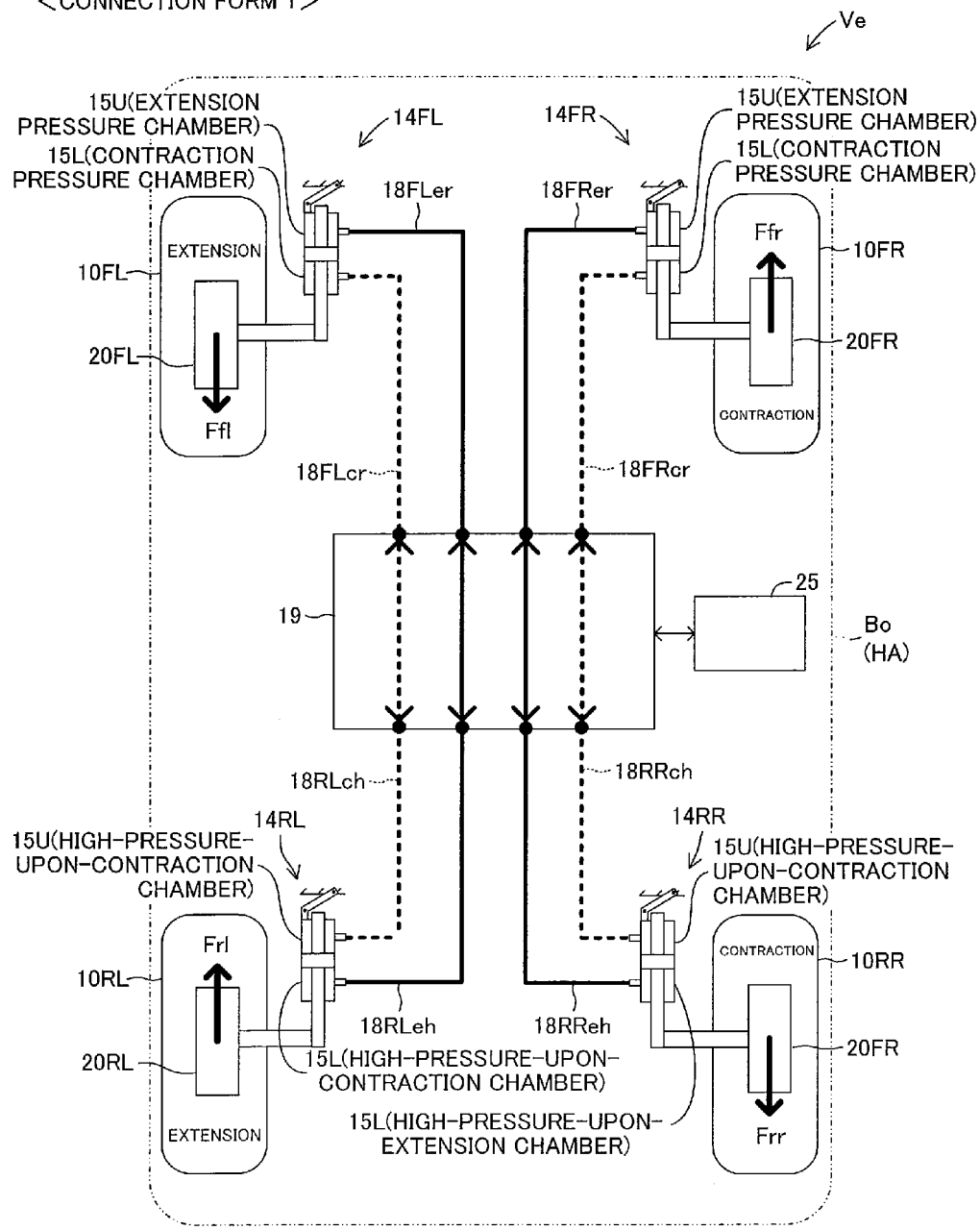
FIG. 6 is a schematic diagram illustrating a connection form 1 among the respective fluid pressure cylinders via a direction control circuit according to the embodiment of the present invention.

As illustrated in FIG. 6, a connection form 1 is a connection form between the fluid pressure cylinders 14RL and 14RR (hydraulic pressure supplying side) and the fluid pressure cylinders 14FL and 14FR (hydraulic pressure supplied side) for controlling (assisting) the heave behavior and the roll behavior generated on the body Bo of the vehicle Ve, for example, in a turning state. Specifically, in the connection form 1, as illustrated in FIG. 6, the electronic control unit 25 upward displaces the left side of the body Bo (displaces toward the extension direction with respect to the road surface), and downward displaces the right side of the body Bo (displaces toward the contraction direction with respect to the road surface), thereby controlling the behavior of the body Bo.

Therefore, the electronic control unit 25 controls the rotations of the respective in-wheel motors 20 via the inverter 21 or controls the brake mechanisms 23 via the brake actuator 24 to generate, as illustrated in FIG. 6, the front left braking/driving force Ffl on the front left wheel 10FL as a relative braking force, and the rear left driving force Frl on the rear left wheel 10RL as a relative driving force. As a result, upward vertical forces caused by reaction forces of the suspension mechanisms 11FL and 11RL act on the left side of the body Bo (vehicle Ve), resulting in an upward displacement (namely, displacement toward the extension direction) of the left side of the body Bo. On the other hand, as illustrated in FIG. 6, the electronic control unit 25 generates the front right braking/driving force Ffr on the front right wheel 10FR as a relative driving force, and generates the rear right driving force Frr on the rear right wheel 10RR as a relative braking force. As a result, downward vertical forces caused by reaction forces of the suspension mechanisms 11FL and 11RL act on the right side of the body Bo (vehicle Ve), resulting in a downward displacement (namely, displacement toward the contraction direction) of the right side of the body Bo. Note that, the respective braking/driving forces Ffl, Ffr, Frl, and Frr on the front left and right wheels 10FL and 10FR and the rear left and right wheels 10RL and 10RR are the same in magnitude.

Moreover, the electronic control unit 25 controls opening/closing of respective direction control valves constructing the direction control circuit 19, and, as illustrated in FIG. 6, on the left side of the body Bo (vehicle Ve), connects the pipeline 18RLch (broken line) connected to the high-pressure-upon-contraction chamber 15U of the fluid pressure cylinder 14RL on the hydraulic pressure supplying side and the pipeline 18FLcr (broken line) connected to the contraction pressure chamber 15L of the fluid pressure cylinder 14FL on the hydraulic pressure supplied side to each other for communication. Similarly, as illustrated in FIG. 6, the electronic control unit 25 connects the pipeline 18RLeh (solid line) connected to the high-pressure-upon-contraction chamber 15L of the fluid pressure cylinder 14RL on the hydraulic pressure supplying side and the pipeline 18Fler (solid line) connected to the extension pressure chamber 15U of the fluid pressure cylinder 14FL on the hydraulic pressure supplied side to each other for communication.

On the other hand, as illustrated in FIG. 6, the electronic control unit 25 connects, on the right side of the body Bo (vehicle Ve), the pipeline 10RRch (broken line) connected to the high-pressure-upon-contraction chamber 15U of the fluid pressure cylinder 14RR on the hydraulic pressure supplying side and the pipeline 18FRcr (broken line) connected to the contraction pressure chamber 15L of the fluid pressure cylinder 14FR on the hydraulic pressure supplied side to each other for communication. Similarly, as illustrated in FIG. 6, the electronic control unit 25 connects the pipeline 18RReh (solid line) connected to the high-pressure-upon-extension chamber 15L of the fluid pressure cylinder 14RR on the hydraulic pressure supplying side and the pipeline 18FRer (solid line) connected to the extension pressure chamber 15U of the fluid pressure cylinder 14FR on the hydraulic pressure supplied side to each other for communication.

In the connection form 1, the electronic control unit 25 independently applies driving control to the in-wheel motors 20RL and 20RR, thereby generating the braking/driving force Frl corresponding to the driving force on the rear left wheel 10RL to displace the left side of the body Bo toward the extension direction, and generating the braking/driving force Frr corresponding to braking force on the rear right wheel 10RR to displace the left side of the body Bo toward the contraction direction. In this manner, the hydraulic pressure in the high-pressure-upon-extension chamber 15L of the fluid pressure cylinder 14RL increases as the rear left side of the body Bo is actively displaced toward the extension direction, and the hydraulic pressure in the high-pressure-upon-contraction chamber 15L of the fluid pressure cylinder 14RR increases as the rear right side of the body Bo is actively displaced toward the contraction direction.

Then, in this connection form 1, the hydraulic pressure increased in the high-pressure-upon-extension chamber 15L of the fluid pressure cylinder 14RL is supplied to the extension pressure chamber 15U of the fluid pressure cylinder 14FL communicating via the pipeline 18RLeh, the direction control circuit 19, and the pipeline 18FLer, and the hydraulic pressure increased in the high-pressure-upon-contraction chamber 15U of the fluid pressure cylinder 14RR is supplied to the contraction pressure chamber 15L of the fluid pressure cylinder 14FR communicating via the pipeline 18RRch, the direction control circuit 19, and the pipeline 18FRcr. In this manner, as the hydraulic pressure in the extension pressure chamber 15U increases in the fluid pressure cylinder 14FL, the fluid pressure cylinder 14FL can extend between the body Bo (sprung member HA) and the unsprung member LA, thereby upward displacing the front left side of the body Bo. On the other hand, as the hydraulic pressure in the contraction pressure chamber 15L increases in the fluid pressure cylinder 14RR, the fluid pressure cylinder 14RR can contract between the body Bo (sprung member HA) and the unsprung member LA, thereby downward displacing the front right side of the body Bo.

In the description given above, the case where the left side of the body Bo (vehicle Ve) is displaced upward and the right side of the body Bo (vehicle Ve) is displaced downward has been exemplified. However, it should be understood that the connection form 1 includes a case where the left side of the body Bo (vehicle Ve) is displaced downward and the right side of the body Bo (vehicle Ve) is displaced upward. In this case, as illustrated in FIG. 6, the hydraulic pressure increased in the high-pressure-upon-contraction chamber 15U of the fluid pressure cylinder 14RL is supplied to the contraction pressure chamber 15L of the fluid pressure cylinder 14FL communicating via the pipeline 18RLch, the direction control circuit 19, and the pipeline 18FLcr, and the hydraulic pressure increased in the high-pressure-upon-extension chamber 15L of the fluid pressure cylinder 14RR is supplied to the extension pressure chamber 15U of the fluid pressure cylinder 14FR communicating via the pipeline 18RReh, the direction control circuit 19, and the pipeline 18FRer. In this manner, as the hydraulic pressure in the contraction pressure chamber 15L increases in the fluid pressure cylinder 14FL, the fluid pressure cylinder 14FL can contract between the body Bo (sprung member HA) and the unsprung member LA, thereby downward displacing the front left side of the body Bo. On the other hand, as the hydraulic pressure in the extension pressure chamber 15U increases in the fluid pressure cylinder 14FR, the fluid pressure cylinder 14FR can contract between the body Bo (sprung member HA) and the unsprung member LA, thereby upward displacing the front right side of the body Bo.

Thus, in the connection form 1, even when the magnitudes of the braking/driving forces Ffl, Ffr, Frl, and Frr (motor torques of the respective in-wheel motors 20) on the respective wheels 10 are equalized, the roll behavior of the body Bo can be appropriately controlled (assisted) by using the vertical forces by the fluid pressure cylinders 14FL and 14FR.

Moreover, in the connection form 1, when the in-wheel motors 20RL and 20RR are controlled to drive, thereby displacing the side of the rear left and right wheels 10RL and 10RR of the body Bo toward the extension direction (or the contraction direction), the hydraulic pressures in the high-pressure-upon-extension chambers 15L (or high-pressure-upon-contraction chambers 15U) of the fluid pressure cylinders 14RL and 14RR increase, and the hydraulic pressures are supplied to the extension pressure chambers 15U (or contraction pressure chambers 15L) of the fluid pressure cylinders 14FL and 14FR. In this manner, the hydraulic pressures in the extension pressure chambers 15U (or the contraction pressure chambers 15L) increase in the fluid pressure cylinders 14FL and 14FR, as in the side of the rear left and right wheels 10RL and 10RR of the body Bo, and the fluid pressure cylinders 14FL and 14FR can extend (or contract) between the body Bo (sprung member HA) and the unsprung member LA, thereby displacing the body Bo upward (or downward). Thus, the heave behavior of the body Bo can be appropriately controlled (assisted) in the connection form 1. Further, the control of the heave behavior (maintenance of the vehicle height) in this way can also provide an effect of, for example, restraining an attitude change caused by a useless pitch behavior generated on the body Bo (sprung member HA) caused by the driving control for the in-wheel motors 20.

(2) Connection Form 2

Figure 7:
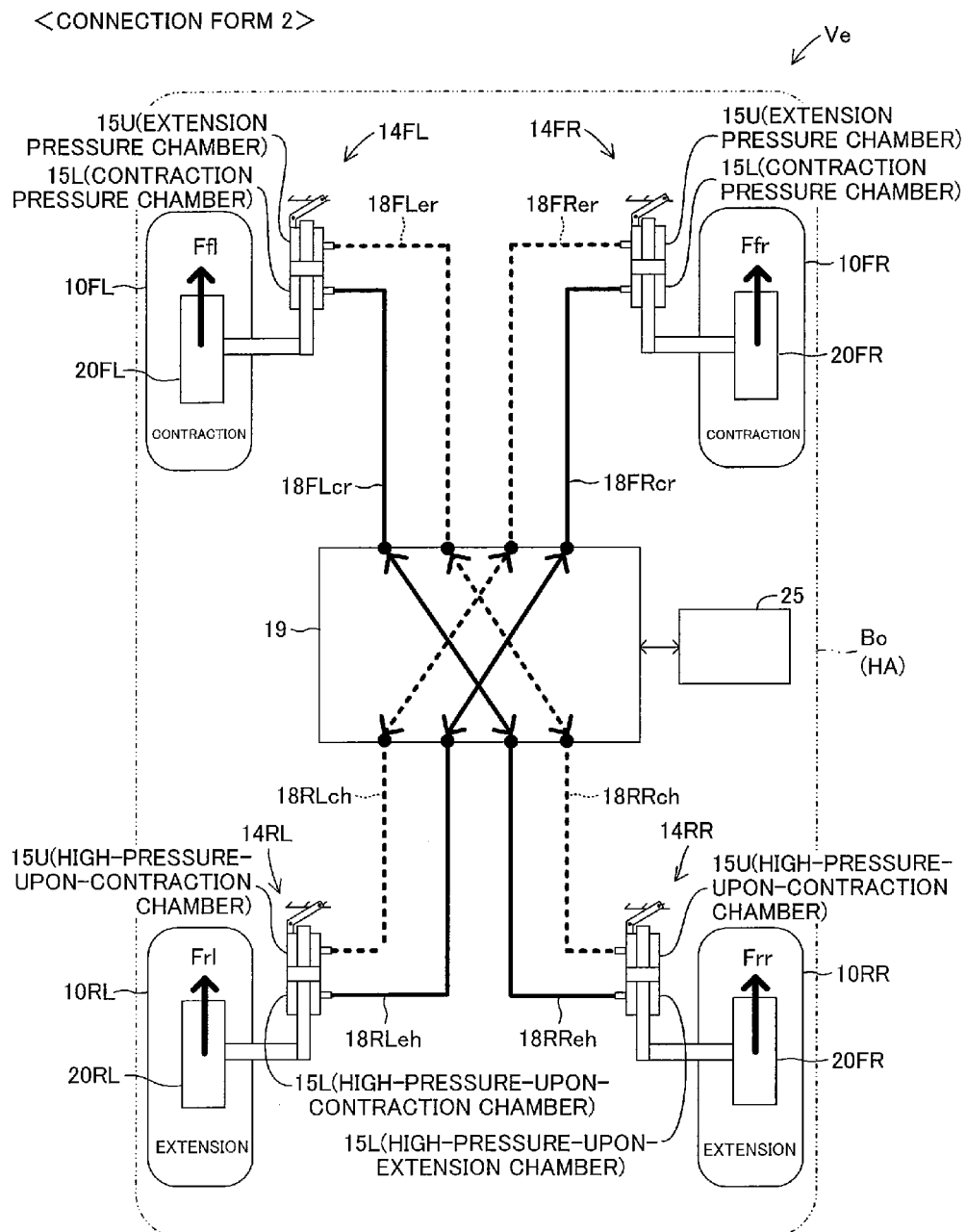
FIG. 7 is a schematic diagram illustrating a connection form 2 among the respective fluid pressure cylinders via the direction control circuit according to the embodiment of the present invention.

As illustrated in FIG. 7, a connection form 2 is a connection form between the fluid pressure cylinders 14RL and 14RR (hydraulic pressure supplying side) and the fluid pressure cylinders 14FL and 14FR (hydraulic pressure supplied side) for controlling (assisting) the pitch behavior and the roll behavior generated on the body Bo of the vehicle Ve, for example, in a turning state. Specifically, in the connection form 2, as illustrated in FIG. 7, the electronic control unit 25 downward displaces the front side of the body Bo (displaces toward the contraction direction with respect to the road surface), and upward displaces the rear side of the body Bo (displaces toward the extension direction with respect to the road surface), thereby controlling the behavior of the body Bo.

Thus, the electronic control unit 25 controls the rotations of the respective in-wheel motors 20 via the inverter 21, and, as illustrated in FIG. 7, generates the respective braking/driving forces Ffl, Ffr, Frl, and Frr of the front left and right wheel 10FL and 10FR and the rear left and right wheels 10RL and 10RR as the driving forces same in magnitude. In this manner, downward vertical forces caused by reaction forces of the suspension mechanisms 11FL and 11FR act on the front side of the body Bo (vehicle Ve), resulting in a downward displacement (namely, displacement toward the contraction direction) of the front side of the body Bo. On the other hand, upward vertical forces caused by reaction forces of the suspension mechanisms 11RL and 11RR act on the rear side of the body Bo (vehicle Ve), resulting in an upward displacement (namely, displacement toward the extension direction) of the rear side of the body Bo.

Moreover, the electronic control unit 25 controls the opening/closing of the respective direction control valves constructing the direction control circuit 19 to connect, as illustrated in FIG. 7, diagonal positions of the body Bo (vehicle Ve) to each other, in other words, to connect the fluid pressure cylinder 14FL located at the front left wheel 10FL and the fluid pressure cylinder 14RR located at the rear right wheel 10RR to each other, and to connect the fluid pressure cylinder 14FR located at the front right wheel 10FR and the fluid pressure cylinder 14RL located at the rear left wheel 10RL to each other. Specifically, as illustrated in FIG. 7, the electronic control unit 25 connects the pipeline 18RLch (broken line) connected to the high-pressure-upon-contraction chamber 15U of the fluid pressure cylinder 14RL on the hydraulic pressure supplying side and the pipeline 18FRer (broken line), which is arranged diagonally to the pipeline 18RLch and connected to the extension pressure chamber 15U of the fluid pressure cylinder 14FR on the hydraulic pressure supplied side, to each other for communication. Similarly, as illustrated in FIG. 7, the electronic control unit 25 connects the pipeline 18RLeh (solid line) connected to the high-pressure-upon-extension chamber 15L of the fluid pressure cylinder 14RL on the hydraulic pressure supplying side and the pipeline 18FRcr (solid line), which is arranged diagonally to the pipeline 18RLeh and is connected to the contraction pressure chamber 15L of the fluid pressure cylinder 14FR on the hydraulic pressure supplied side, to each other for communication.

Further, as illustrated in FIG. 7, the electronic control unit 25 connects the pipeline 18RRch (broken line) connected to the high-pressure-upon-contraction chamber 15U of the fluid pressure cylinder 14RR on the hydraulic pressure supplying side and the pipeline 18FLer (broken line), which is arranged diagonally to the pipeline 18RRch and is connected to the extension pressure chamber 15U of the fluid pressure cylinder 14FL on the hydraulic pressure supplied side, to each other for communication. Similarly, as illustrated in FIG. 7, the electronic control unit 25 connects the pipeline 18RReh (solid line) connected to the high-pressure-upon-extension chamber 15L of the fluid pressure cylinder 14RR on the hydraulic pressure supplying side and the pipeline 18FLcr (solid line), which is arranged diagonally to the pipeline 18RRch and is connected to the contraction pressure chamber 15L of the fluid pressure cylinder 14FL on the hydraulic pressure supplied side, to each other for communication.

In the connection form 2, the electronic control unit 25 independently applies the driving control to the in-wheel motors 20FL, 20FR, 20RL, and 20RR, thereby generating the braking/driving force Ffl and Ffr corresponding to driving force on the front left wheels 10FL and 10FR to displace the front side of the body Bo toward the contraction direction, and generating the braking/driving force Frl and Frr corresponding to braking force on the rear left and right wheels 10RL and 10RR to displace the rear side of the body Bo toward the extension direction. In this manner, the hydraulic pressure in the high-pressure-upon-extension chamber 15L of the fluid pressure cylinders 14RL and 14RR increases as the rear side of the body Bo is actively displaced toward the extension direction.

Then, in this connection form 2, the hydraulic pressure increased in the high-pressure-upon-extension chamber 15L of the fluid pressure cylinder 14RL is supplied to the contraction pressure chamber 15L of the fluid pressure cylinder 14FR communicating via the pipeline 18RLeh, the direction control circuit 19, and the pipeline 18FRcr, and the hydraulic pressure increased in the high-pressure-upon-extension chamber 15L of the fluid pressure cylinder 14RR is supplied to the contraction pressure chamber 15L of the fluid pressure cylinder 14FL communicating via the pipeline 18RReh, the direction control circuit 19, and the pipeline 18FLcr. In this manner, as the hydraulic pressures in the contraction pressure chambers 15L increase in the fluid pressure cylinders 14FL and 14FR, the fluid pressure cylinders 14FL and 14FR can contract between the body Bo (sprung member HA) and the unsprung member LA, thereby downward displacing the front side of the body Bo.

In the description given above, the case where the front side of the body Bo (vehicle Ve) is displaced downward and the rear side of the body Bo (vehicle Ve) is displaced upward has been exemplified. However, it should be understood that the connection form 2 includes a case where the front side of the body Bo (vehicle Ve) is displaced upward and the rear side of the body Bo (vehicle Ve) is displaced downward. In this case, as illustrated in FIG. 7, the hydraulic pressure increased in the high-pressure-upon-contraction chamber 15U of the fluid pressure cylinder 14RL is supplied to the extension pressure chamber 15U of the fluid pressure cylinder 14FR communicating via the pipeline 18RLch, the direction control circuit 19, and the pipeline 18FRer, and the hydraulic pressure increased in the high-pressure-upon-contraction chamber 15U of the fluid pressure cylinder 14RR is supplied to the extension pressure chamber 15U of the fluid pressure cylinder 14FL communicating via the pipeline 18RRch, the direction control circuit 19, and the pipeline 18FLer. In this manner, as the hydraulic pressures in the extension pressure chambers 15U increase in the fluid pressure cylinders 14FL and 14FR, the fluid pressure cylinders 14FL and 14FR can extend between the body Bo (sprung member HA) and the unsprung member LA, thereby upward displacing the front side of the body Bo.

Thus, in the connection form 2, even when the braking/driving forces Ffl, Ffr, Frl, and Frr (motor torques of the respective in-wheel motors 20) on the respective wheels 10 are equalized, the pitch behavior of the body Bo can be appropriately controlled (assisted) by using the vertical forces by the fluid pressure cylinders 14FL and 14FR.

Moreover, when the in-wheel motors 20RL and 20RR are controlled for driving to displace the rear left wheel 10RL side of the body Bo toward the extension direction (or contraction direction) and to displace the rear right wheel 10RR side of the body Bo toward the contraction direction (or extension direction), the hydraulic pressure in the high-pressure-upon-extension chamber 15L (or high-pressure-upon-contraction chamber 15U) of the fluid pressure cylinder 14RL increases and the hydraulic pressure in the high-pressure-upon-contraction chamber 15U (or high-pressure-upon-extension chamber 15L) of the fluid pressure cylinder 14RR increases. Then, in the connection form 2, the hydraulic pressure (high pressure) from the high-pressure-upon-extension chamber 15L (or high-pressure-upon-contraction chamber 15U) of the fluid pressure cylinder 14RL is supplied to the contraction pressure chamber 15L (or extension pressure chamber 15U) of the fluid pressure cylinder 14FR, and the hydraulic pressure (high pressure) from the high-pressure-upon-contraction chamber 15U (or high-pressure-upon-extension chamber 15L) of the fluid pressure cylinder 14RR is supplied to the extension pressure chamber 15U (or contraction pressure chamber 15L) of the fluid pressure cylinder 14FL.

In this manner, the hydraulic pressure in the contraction pressure chamber 15L (or extension pressure chamber 15U) increases in the fluid pressure cylinder 14FR as the fluid pressure cylinder 14RL extends (contracts), and the hydraulic pressure in the extension pressure chamber 15U (or contraction pressure chamber 15L) increases in the fluid pressure cylinder 14FL as the fluid pressure cylinder 14RR contracts (extends). Therefore, as in the fluid pressure cylinder 14RR, the fluid pressure cylinder 14FR contracts (or extends) between the body Bo (sprung member HA) and the unsprung member LA, thereby displacing the front right side of the body Bo downward (or upward), and, as in the fluid pressure cylinder 14RL, the fluid pressure cylinder 14FL extends (or contracts) between the body Bo (sprung member HA) and the unsprung member LA, thereby displacing the front left side of the body Bo upward (or downward). Thus, the roll behavior of the body Bo can be appropriately controlled (assisted) in the connection form 2. Further, the control of the pitch behavior (maintenance of the vehicle height) in the above-mentioned way can also provide an effect of, for example, restraining an attitude change caused by a useless heave behavior generated on the body Bo (sprung member HA) caused by the driving control for the in-wheel motors 20.

(3) Connection Form 3

Figure 8:
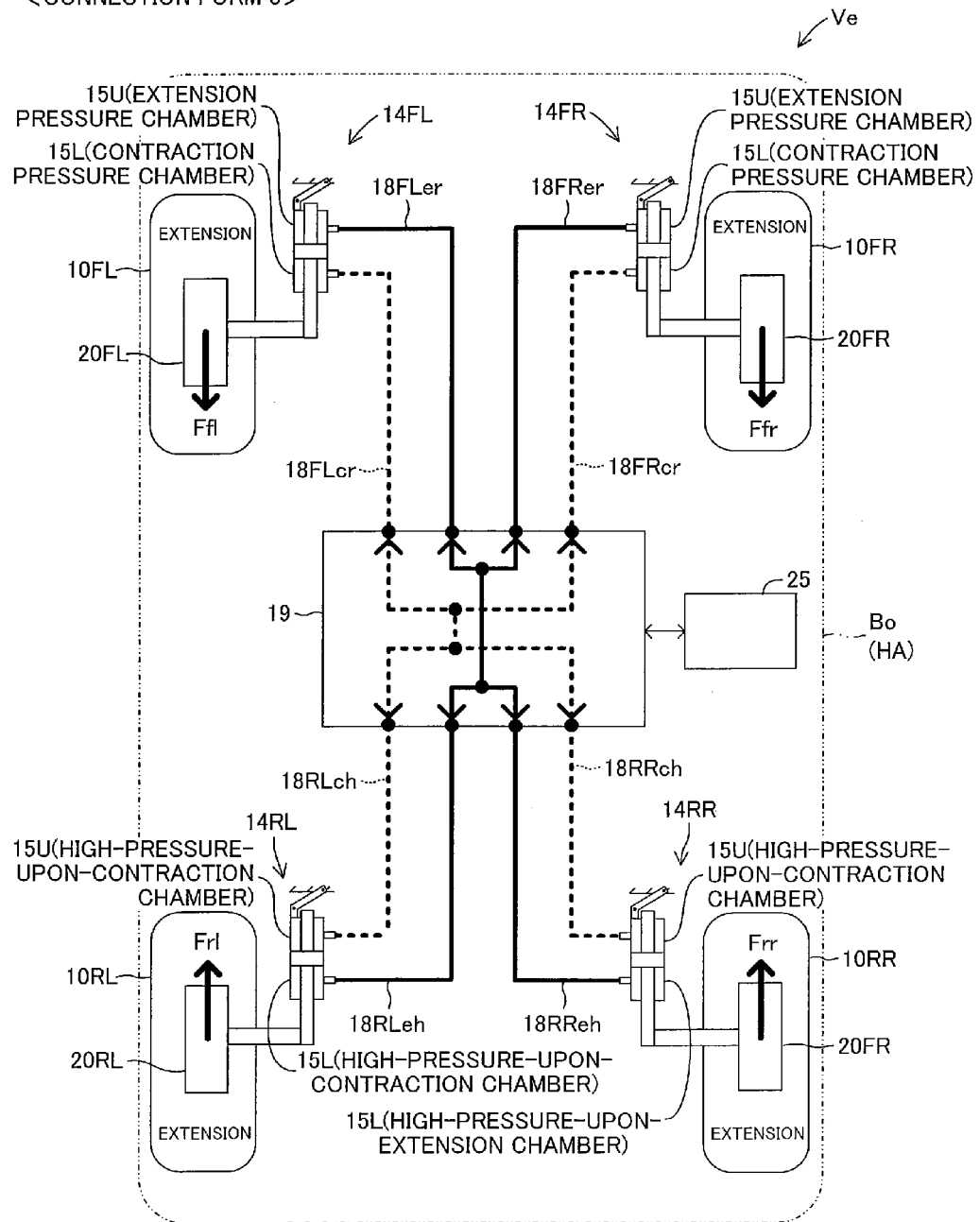
FIG. 8 is a schematic diagram illustrating a connection form 3 among the respective fluid pressure cylinders via the direction control circuit according to the embodiment of the present invention.

As illustrated in FIG. 8, a connection form 3 is a connection form between the fluid pressure cylinders 14RL and 14RR (hydraulic pressure supplying side) and the fluid pressure cylinders 14FL and 14FR (hydraulic pressure supplied side) for controlling (assisting) the heave behavior generated on the body Bo of the vehicle Ve, for example, in a traveling state. Specifically, in the connection form 3, as illustrated in FIG. 8, the electronic control unit 25 upward or downward displaces the front and rear sides of the body Bo toward the same direction (displaces toward the extension direction or the contraction direction with respect to the road surface), thereby controlling the behavior of the body Bo.

Therefore, the electronic control unit 25 controls the rotations of the respective in-wheel motors 20 via the inverter 21 or controls the brake mechanisms 23 via the brake actuator 24 to generate, as illustrated in FIG. 8, the respective braking/driving forces Ffl and Ffr on the front left and right wheels 10FL and 10FR as a relative braking forces and the respective driving forces Frl and Frr on the rear left and right wheels 10RL and 10RR as relative driving forces. Note that, the respective braking/driving forces Ffl, Ffr, Frl, and Frr on the front left and right wheels 10FL and 10FR, and the rear left and right wheels 10RL and 10RR are the same in magnitude. As a result, upward vertical forces caused by reaction forces of the suspension mechanisms 11FL and 11FR act on the front side of the body Bo (vehicle Ve), resulting in an upward displacement (namely, displacement toward the extension direction) of the front side of the body Bo. On the other hand, upward vertical forces caused by reaction forces of the suspension mechanisms 11RL and 11RR act on the rear side of the body Bo (vehicle Ve), also resulting in an upward displacement (namely, displacement toward the extension direction) of the rear side of the body Bo.

Moreover, the electronic control unit 25 controls the opening/closing of the respective direction control valves constructing the direction control circuit 19 to connect, as illustrated in FIG. 8, for the left and right sides of the body Bo (vehicle Ve), the fluid pressure cylinder 14RL located at the rear left wheel 10RL and the fluid pressure cylinder 14RR located at the rear right wheel 10RR to each other, and the fluid pressure cylinder 14FL located at the front left wheel 10FL and the fluid pressure cylinder 14FR located at the front right wheel 10FR to each other. Further, the electronic control unit 25 connects, to each other, the fluid pressure cylinders 14RL and 14RR connected to each other and the fluid pressure cylinders 14FL and 14FR connected to each other.

Specifically, as illustrated in FIG. 8, regarding the fluid pressure cylinders 14RL and 14RR on the hydraulic pressure supplying side, the electronic control unit 25 connects the pipeline 18RLch (broken line) connected to the high-pressure-upon-contraction chamber 15U of the fluid pressure cylinder 14RL and the pipeline 18RRch (broken line) connected to the high-pressure-upon-contraction chamber 15U of the fluid pressure cylinder 14RR to each other for communication (the connected pipelines are hereinafter referred to as high-pressure-upon-contraction chamber connection pipeline), and connects the pipeline 18RLeh (solid line) connected to the high-pressure-upon-extension chamber 15L of the fluid pressure cylinder 14RL and the pipeline 18RReh (solid line) connected to the high-pressure-upon-extension chamber 15L of the fluid pressure cylinder 14RR to each other for communication (the connected pipelines are hereinafter referred to as high-pressure-upon-extension chamber connection pipeline).

Further, as illustrated in FIG. 8, regarding the fluid pressure cylinders 14FL and 14FR on the hydraulic pressure supplied side, the electronic control unit 25 connects the pipeline 18FLcr (broken line) connected to the contraction pressure chamber 15L of the fluid pressure cylinder 14FL and the pipeline 18FRcr (broken line) connected to the contraction pressure chamber 15L of the fluid pressure cylinder 14FR to each other (the connected pipelines are hereinafter referred to as contraction pressure chamber connection pipeline), and connects the pipeline 18FLer (solid line) connected to the extension pressure chamber 15U of the fluid pressure cylinder 14FL and the pipeline 18FRer (solid line) connected to the extension pressure chamber 15U of the fluid pressure cylinder 14FR to each other (the connected pipelines are hereinafter referred to as extension pressure chamber connection pipeline).

Further, as illustrated in FIG. 8, the electronic control unit 25 connects the high-pressure-upon-contraction chamber connection pipeline (broken line) on the hydraulic pressure supplying side and the contraction pressure chamber connection pipeline (broken line) on the hydraulic pressure supplied side to each other for communication. Further, as illustrated in FIG. 8, the electronic control unit 25 connects the high-pressure-upon-extension chamber connection pipeline (solid line) on the hydraulic pressure supplying side and the extension pressure chamber connection pipeline (solid line) on the hydraulic pressure supplied side to each other for communication.

In the connection form 3, the electronic control unit 25 independently applies the driving control to the in-wheel motors 20FL, 20FR, 20RL, and 20RR, thereby generating the braking/driving forces Ffl and Ffr corresponding to braking forces on the front left and right wheels 10FL and 10FR to displace the front side of the body Bo toward the extension direction, and generating the braking/driving forces Frl and Frr corresponding to driving forces on the rear left and right wheels 10RL and 10RR to displace the rear side of the body Bo toward the extension direction. In this manner, as the rear side of the body Bo actively displaces toward the extension direction, the hydraulic pressures in the high-pressure-upon-extension chambers 15L of the fluid pressure cylinders 14RL and 14RR increase.

Then, in the connection form 3, the hydraulic pressures increased in the high-pressure-upon-extension chambers 15L of the fluid pressure cylinders 14RL and 14RR are supplied to the extension pressure chambers 15U of the fluid pressure cylinders 14FL and 14FR communicating via the pipeline 18RLeh, the pipeline 18RReh, the direction control circuit 19, the pipeline 18FLer, and the pipeline 18FRer. In this manner, as the hydraulic pressures in the extension pressure chambers 15U increase in the fluid pressure cylinders 14FL and 14FR, the fluid pressure cylinders 14FL and 14FR extend between the body Bo (sprung member HA) and the unsprung member LA, thereby upward displacing the front side of the body Bo.

In the description given above, the case where the front and rear sides of the body Bo (vehicle Ve) are displaced upward has been exemplified. However, it should be understood that the connection form 3 includes a case where the front and right sides of the body Bo (vehicle Ve) are displaced downward. In this case, as illustrated in FIG. 8, the hydraulic pressure increased in the high-pressure-upon-contraction chamber 15U of the fluid pressure cylinders 14RL and 14RR is supplied to the contraction pressure chamber 15L of the fluid pressure cylinders 14FL and 14FR communicating via the pipeline 18RLch, the pipeline 18RRch, the direction control circuit 19, the pipeline 18FLcr, and the pipeline 18FRcr. In this manner, as the hydraulic pressures in the contraction pressure chambers 15L increase in the fluid pressure cylinders 14FL and 14FR, the fluid pressure cylinders 14FL and 14FR can contract between the body Bo (sprung member HA) and the unsprung member LA, thereby downward displacing the front side of the body Bo.

Thus, in the connection form 3, even when the braking/driving forces Ffl, Ffr, Frl, and Frr (motor torques of the respective in-wheel motors 20) on the respective wheels 10 are equalized, the heave behavior of the body Bo can be appropriately controlled (assisted) by using the vertical forces by the fluid pressure cylinders 14FL and 14FR. Moreover, the control of the heave behavior (maintenance of the vehicle height) in this way also provides an effect of, for example, restraining an attitude change caused by a useless pitch behavior generated on the body Bo (sprung member HA) caused by the driving control for the in-wheel motors 20.

(4) Connection Form 4

Figure 9:
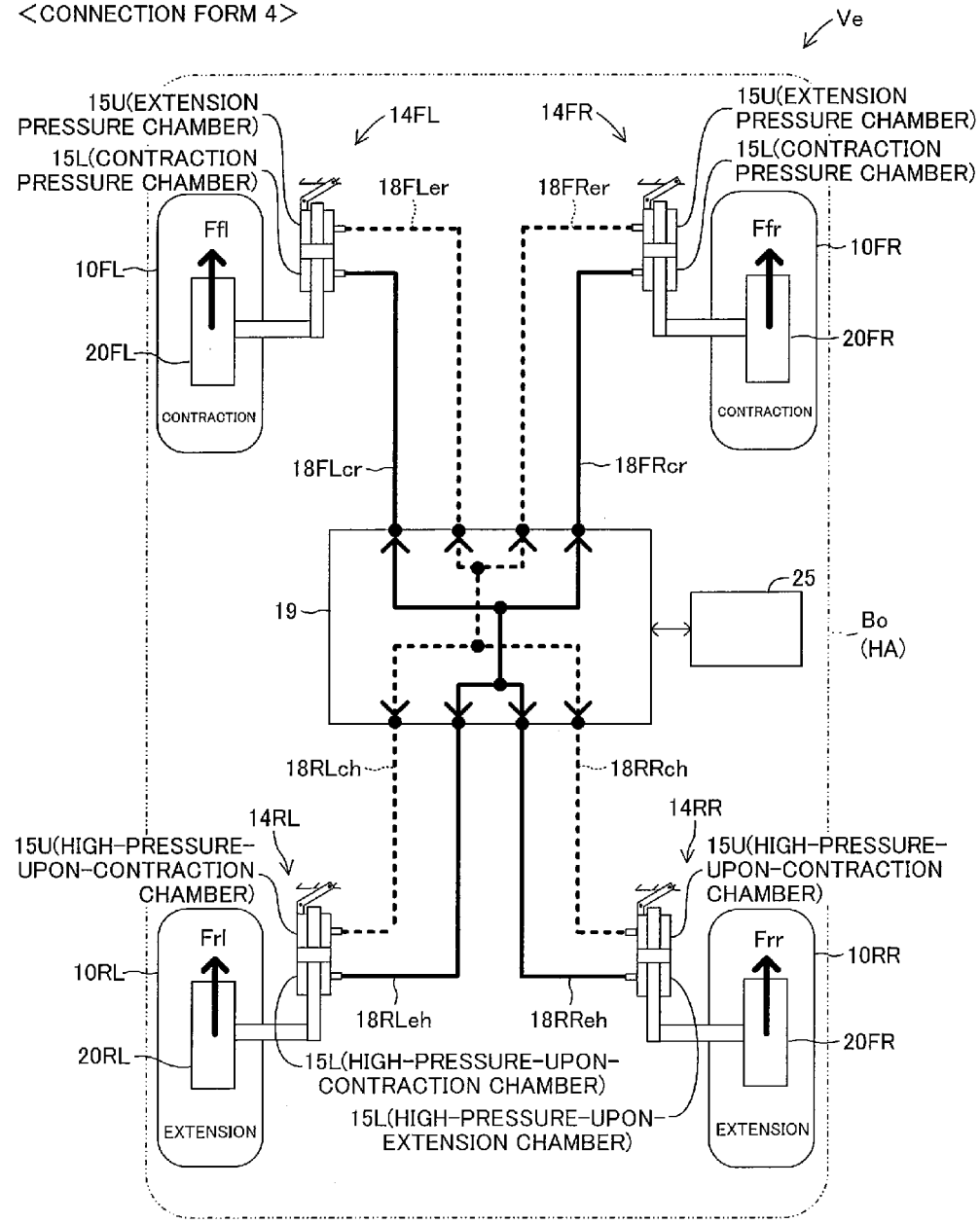
FIG. 9 is a schematic diagram illustrating a connection form 4 among the respective fluid pressure cylinders via the direction control circuit according to the embodiment of the present invention.

As illustrated in FIG. 9, a connection form 4 is a connection form between the fluid pressure cylinders 14RL and 14RR (hydraulic pressure supplying side) and the fluid pressure cylinders 14FL and 14FR (hydraulic pressure supplied side) for controlling (assisting) the pitch behavior generated on the body Bo of the vehicle Ve, for example, in a traveling state. Specifically, in the connection form 4, as illustrated in FIG. 9, the electronic control unit 25 downward displaces the front side of the body Bo (displaces toward the contraction direction with respect to the road surface), and upward displaces the rear side of the body Bo (displaces toward the extension direction with respect to the road surface), thereby controlling the pitch behavior of the body Bo.

Therefore, the electronic control unit 25 controls the rotations of the respective in-wheel motors 20 via the inverter 21 to generate, as illustrated in FIG. 9, the respective braking/driving forces Ffl, Ffr, Frl, and Frr on the front left and right wheels 10FL and 10FR and on the rear left and right wheels 10RL and 10RR as the same driving forces in magnitude. As a result, downward vertical forces caused by reaction forces of the suspension mechanisms 11FL and 11FR act on the front side of the body Bo (vehicle Ve), resulting in a downward displacement (namely, displacement toward the contraction direction) of the front side of the body Bo. On the other hand, upward vertical forces caused by reaction forces of the suspension mechanisms 11RL and 11RR act on the rear side of the body Bo (vehicle Ve), resulting in an upward displacement (namely, displacement toward the extension direction) of the rear side of the body Bo.

Moreover, the electronic control unit 25 controls the opening/closing of the respective direction control valves constructing the direction control circuit 19 to connect, as illustrated in FIG. 9, for the left and right sides of the body Bo (vehicle Ve), the fluid pressure cylinder 14RL located at the rear left wheel 10RL and the fluid pressure cylinder 14RR located at the rear right wheel 10RR to each other, and the fluid pressure cylinder 14FL located at the front left wheel 10FL and the fluid pressure cylinder 14FR located at the front right wheel 10FR to each other. Further, the electronic control unit 25 connects, to each other, the fluid pressure cylinders 14RL and 14RR connected to each other and the fluid pressure cylinders 14FL and 14FR connected to each other.

Specifically, as illustrated in FIG. 9, regarding the fluid pressure cylinders 14RL and 14RR on the hydraulic pressure supplying side, the electronic control unit 25 connects the pipeline 18RLch (broken line) connected to the high-pressure-upon-contraction chamber 15U of the fluid pressure cylinder 14RL and the pipeline 18RRch (broken line) connected to the high-pressure-upon-contraction chamber 15U of the fluid pressure cylinder 14RR to each other via the high-pressure-upon-contraction chamber connection pipeline for communication, and connects the pipeline 18RLeh (solid line) connected to the high-pressure-upon-extension chamber 15L of the fluid pressure cylinder 14RL and the pipeline 18RReh (solid line) connected to the high-pressure-upon-extension chamber 15L of the fluid pressure cylinder 14RR to each other via the high-pressure-upon-extension chamber connection pipeline for communication.

Moreover, as illustrated in FIG. 9, regarding the fluid pressure cylinders 14FL and 14FR on the hydraulic pressure supplied side, the electronic control unit 25 connects the pipeline 18FLcr (solid line) connected to the contraction pressure chamber 15L of the fluid pressure cylinder 14FL and the pipeline 18FRcr (solid line) connected to the contraction pressure chamber 15L of the fluid pressure cylinder 14FR to each other via the contraction pressure chamber connection pipeline for communication, and connects the pipeline 18FLer (broken line) connected to the extension pressure chamber 15U of the fluid pressure cylinder 14FL and the pipeline 18FRer (broken line) connected to the extension pressure chamber 15U of the fluid pressure cylinder 14FR to each other via the extension pressure chamber connection pipeline for communication.

Further, in the connection form 4, as illustrated in FIG. 9, the electronic control unit 25 connects the high-pressure-upon-extension chamber connection pipeline (broken line) on the hydraulic pressure supplying side and the contraction pressure chamber connection pipeline (broken line) on the hydraulic pressure supplied side to each other for communication. Further, as illustrated in FIG. 8, the electronic control unit 25 connects the high-pressure-upon-extension chamber connection pipeline (solid line) on the hydraulic pressure supplying side and the contraction pressure chamber connection pipeline (solid line) on the hydraulic pressure supplied side to each other for communication.

In the connection form 4, the electronic control unit 25 independently applies the driving control to the in-wheel motors 20FL, 20FR, 20RL, and 20RR, thereby generating the braking/driving forces Ffl and Ffr corresponding to driving forces on the front left and right wheels 10FL and 10FR to displace the front side of the body Bo toward the contraction direction, and generating the braking/driving forces Frl and Frr corresponding to driving forces on the rear left and right wheels 10RL and 10RR to displace the rear side of the body Bo toward the extension direction. In this manner, as the rear side of the body Bo actively displaces toward the extension direction, the hydraulic pressures in the high-pressure-upon-extension chambers 15L of the fluid pressure cylinders 14RL and 14RR increase.

Then, in the connection form 4, the hydraulic pressures increased in the high-pressure-upon-extension chambers 15L of the fluid pressure cylinders 14RL and 14RR are supplied to the contraction pressure chambers 15L of the fluid pressure cylinders 14FL and 14FR communicating via the pipeline 18RLeh, the pipeline 18RReh, the direction control circuit 19, the pipeline 18FLcr, and the pipeline 18FRcr. In this manner, as the hydraulic pressures in the contraction pressure chambers 15L increase in the fluid pressure cylinders 14FL and 14FR, the fluid pressure cylinders 14FL and 14FR contract between the body Bo (sprung member HA) and the unsprung member LA, thereby downward displacing the front side of the body Bo.

In the description given above, the case where the front side of the body Bo (vehicle Ve) is displaced downward and the rear side of the body Bo (vehicle Ve) is displaced upward has been exemplified. However, it should be understood that the connection form 4 includes a case where the front side of the body Bo (vehicle Ve) is displaced upward and the rear side of the body Bo (vehicle Ve) is displaced downward. In this case, as illustrated in FIG. 9, the hydraulic pressures increased in the high-pressure-upon-contraction chambers 15U of the fluid pressure cylinders 14RL and 14RR are supplied to the extension pressure chambers 15U of the fluid pressure cylinders 14FL and 14FR communicating via the pipeline 18RLch, the pipeline 18RRch, the direction control circuit 19, the pipeline FLer, and the pipeline 18FRer. In this manner, as the hydraulic pressures in the extension pressure chambers 15U increase in the fluid pressure cylinders 14FL and 14FR, the fluid pressure cylinders 14FL and 14FR can extend between the body Bo (sprung member HA) and the unsprung member LA, thereby upward displacing the front side of the body Bo.

Thus, in the connection form 4, even when the braking/driving forces Ffl, Ffr, Frl, and Frr (motor torques of the respective in-wheel motors 20) on the respective wheels 10 are equalized, the pitch behavior of the body Bo can be appropriately controlled (assisted) by using the vertical forces by the fluid pressure cylinders 14FL and 14FR. Moreover, the control of the pitch behavior (maintenance of the vehicle height) in this way also provides an effect of, for example, restraining an attitude change caused by a useless heave behavior generated on the body Bo (sprung member HA) caused by the driving control for the in-wheel motors 20.

(5) Connection Form 5

Figure 10:
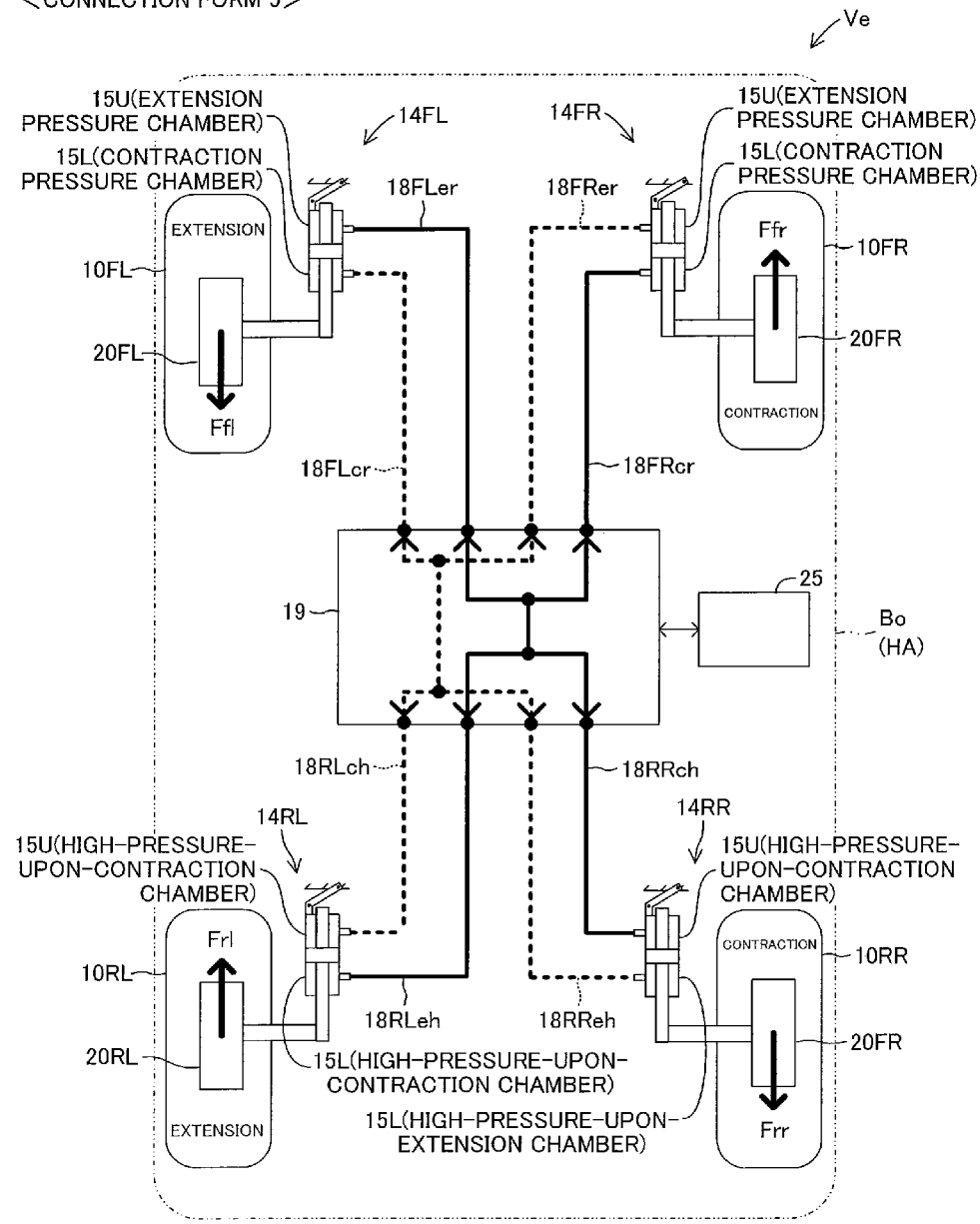
FIG. 10 is a schematic diagram illustrating a connection form 5 among the respective fluid pressure cylinders via the direction control circuit according to the embodiment of the present invention.

As illustrated in FIG. 10, a connection form 5 is a connection form between the fluid pressure cylinders 14RL and 14RR (hydraulic pressure supplying side) and the fluid pressure cylinders 14FL and 14FR (hydraulic pressure supplied side) for controlling (assisting) the roll behavior generated on the body Bo of the vehicle Ve, for example, in a turning state. Specifically, in the connection form 5, as illustrated in FIG. 10, the electronic control unit 25 upward displaces the left side of the body Bo (displaces toward the extension direction with respect to the road surface), and downward displaces the right side of the body Bo (displaces toward the contraction direction with respect to the road surface), thereby controlling the behavior of the body Bo.

Therefore, the electronic control unit 25 controls the rotations of the respective in-wheel motors 20 via the inverter 21 or controls the brake mechanisms 23 via the brake actuator 24 to generate, as illustrated in FIG. 6, the front left braking/driving force Ffl on the front left wheel 10FL as a relative braking force and the rear left driving force Frl on the rear left wheel 10RL as a relative driving force. As a result, upward vertical forces caused by reaction forces of the suspension mechanisms 11FL and 11RL act on the left side of the body Bo (vehicle Ve), resulting in an upward displacement (namely, displacement toward the extension direction) of the left side of the body Bo. On the other hand, as illustrated in FIG. 10, the electronic control unit 25 generates the front right braking/driving force Ffr on the front right wheel 10FR as a relative driving force, and generates the rear right driving force Frr on the rear right wheel 10RR as a relative braking force. As a result, downward vertical forces caused by reaction forces of the suspension mechanisms 11FR and 11RR act on the right side of the body Bo (vehicle Ve), resulting in a downward displacement (namely, displacement toward the contraction direction) of the right side of the body Bo. Note that, the respective braking/driving forces Ffl, Ffr, Frl, and Frr on the front left and right wheels 10FL and 10FR and the rear left and right wheels 10RL and 10RR are the same in magnitude.

Moreover, the electronic control unit 25 controls the opening/closing of the respective direction control valves constructing the direction control circuit 19 to connect, as illustrated in FIG. 10, for the left and right sides of the body Bo (vehicle Ve), the fluid pressure cylinder 14RL located at the rear left wheel 10RL and the fluid pressure cylinder 14RR located at the rear right wheel 10RR to each other, and the fluid pressure cylinder 14FL located at the front left wheel 10FL and the fluid pressure cylinder 14FR located at the front right wheel 10FR to each other. Further, as illustrated in FIG. 10, for the front and rear sides of the body Bo (vehicle Ve), the electronic control unit 25 connects, to each other, the fluid pressure cylinders 14RL and 14RR connected to each other and the fluid pressure cylinders 14FL and 14FR connected to each other.

Specifically, as illustrated in FIG. 10, regarding the fluid pressure cylinders 14RL and 14RR on the hydraulic pressure supplying side, the electronic control unit 25 connects the pipeline 18RLch (broken line) connected to the high-pressure-upon-contraction chamber 15U of the fluid pressure cylinder 14RL and the pipeline 18RRch (broken line) connected to the high-pressure-upon-extension chamber 15L of the fluid pressure cylinder 14RR to each other for communication (the connected pipelines are hereinafter referred to as high-pressure-upon-contraction and extension chamber connection pipelines). Further, the electronic control unit 25 connects the pipeline 18RLeh (solid line) connected to the high-pressure-upon-extension chamber 15L of the fluid pressure cylinder 14RL and the pipeline 18RRch (solid line) connected to the high-pressure-upon-contraction chamber 15U of the fluid pressure cylinder 14RR to each other for communication (the connected pipelines are hereinafter referred to as high-pressure-upon-extension and contraction chamber connection pipelines).

Moreover, as illustrated in FIG. 10, regarding the fluid pressure cylinders 14FL and 14FR on the hydraulic pressure supplying side, the electronic control unit 25 connects the pipeline 18FLch (broken line) connected to the high-pressure-upon-contraction chamber 15L of the fluid pressure cylinder 14FL and the pipeline 18FRer (broken line) connected to the high-pressure-upon-extension chamber 15U of the fluid pressure cylinder 14FR to each other for communication (the connected pipelines are hereinafter referred to as contraction and extension pressure chamber connection pipelines), and the pipeline 18FLeh (solid line) connected to the extension pressure chamber 15U of the fluid pressure cylinder 14FL and the pipeline 18FRcr (solid line) connected to the extension pressure chamber 15L of the fluid pressure cylinder 14FR to each other for communication (the connected pipelines are hereinafter referred to as extension and contraction pressure chamber connection pipelines).

Further, as illustrated in FIG. 10, the electronic control unit 25 connects the high-pressure-upon-contraction and extension chamber connection pipelines (broken line) on the hydraulic pressure supplying side and the contraction and extension pressure chamber connection pipelines (broken line) on the hydraulic pressure supplied side to each other for communication. Further, as illustrated in FIG. 10, the electronic control unit 25 connects the high-pressure-upon-extension and contraction chamber connection pipelines (solid line) on the hydraulic pressure supplying side and the extension and contraction pressure chamber connection pipelines (solid line) on the hydraulic pressure supplied side to each other for communication.

In the connection form 5, the electronic control unit 25 independently applies the driving control to the in-wheel motors 20RL and 20RR, thereby generating the braking/driving force Ffl corresponding to driving force on the rear left wheel 10RL to displace the rear left side of the body Bo toward the extension direction, and generating the braking/driving force Frr corresponding to braking force on the rear right wheel 10RR to displace the rear right side of the body Bo toward the contraction direction. As a result, the hydraulic pressure in the high-pressure-upon-extension chamber 15L of the fluid pressure cylinder 14RL increases as the rear left side of the body Bo is actively displaced toward the extension direction, and the hydraulic pressure in the high-pressure-upon-contraction chamber 15U of the fluid pressure cylinder 14RR increases as the rear right side of the body Bo is actively displaced toward the contraction direction.

Then, in the connection form 5, the hydraulic pressure increased in the high-pressure-upon-extension chamber 15L of the fluid pressure cylinder 14RL and the hydraulic pressure increased in the high-pressure-upon-construction chamber 15U of the fluid pressure cylinder 14RR are supplied to the extension pressure chamber 15U of the fluid pressure cylinder 14FL and the contraction pressure chamber 15L of the fluid pressure cylinder 14FR communicating via the pipeline 18RLeh, the pipeline 18RRch, the direction control circuit 19, the pipeline 18FLer, and the pipeline 18FRcr. In this manner, as the hydraulic pressures in the extension pressure chamber 15U increase in the fluid pressure cylinder 14FL, the fluid pressure cylinder 14FL extends between the body Bo (sprung member HA) and the unsprung member LA, thereby upward displacing the front left side of the body Bo. On the other hand, as the hydraulic pressure in the contraction pressure chamber 15L increases, the fluid pressure cylinder 14FR contracts between the body Bo (sprung member HA) and the unsprung member LA, thereby downward displacing the front right side of the body Bo.

In the description given above, the case where the left side of the body Bo (vehicle Ve) is displaced upward and the right side of the body Bo (vehicle Ve) is displaced downward has been exemplified. However, it should be understood that the connection form 5 includes a case where the left side of the body Bo (vehicle Ve) is displaced downward and the right side of the body Bo (vehicle Ve) is displaced upward. In this case, as illustrated in FIG. 10, the hydraulic pressures increased in the high-pressure-upon-contraction chamber 15U of the fluid pressure cylinder 14RL and the hydraulic pressure increased in the high-pressure-upon-extension chamber 15L of the fluid pressure cylinder 14RR are supplied to the contraction pressure chambers 15L of the fluid pressure cylinder 14FL and the extension pressure chamber 15U of the fluid pressure cylinder 14FR communicating via the pipeline 18RLch, the pipeline 18RReh, the direction control circuit 19, the pipeline 18FLcr, and the pipeline 18FRer. In this manner, as the hydraulic pressure in the contraction pressure chamber 15L increases, the fluid pressure cylinder 14FL can contract between the body Bo (sprung member HA) and the unsprung member LA, thereby downward displacing the front left side of the body Bo. On the other hand, as the hydraulic pressure in the extension pressure chamber 15U increases, the fluid pressure cylinder 14FR can contract between the body Bo (sprung member HA) and the unsprung member LA, thereby upward displacing the front right side of the body Bo.

Thus, in the connection form 5, even when the magnitudes of the braking/driving forces Ffl, Ffr, Frl, and Frr (motor torques of the respective in-wheel motors 20) on the respective wheels 10 are equalized, the roll behavior of the body Bo can be appropriately controlled (assisted) by using the vertical forces by the fluid pressure cylinders 14FL and 14FR.

(6) Connection Form 6

Figure 11:
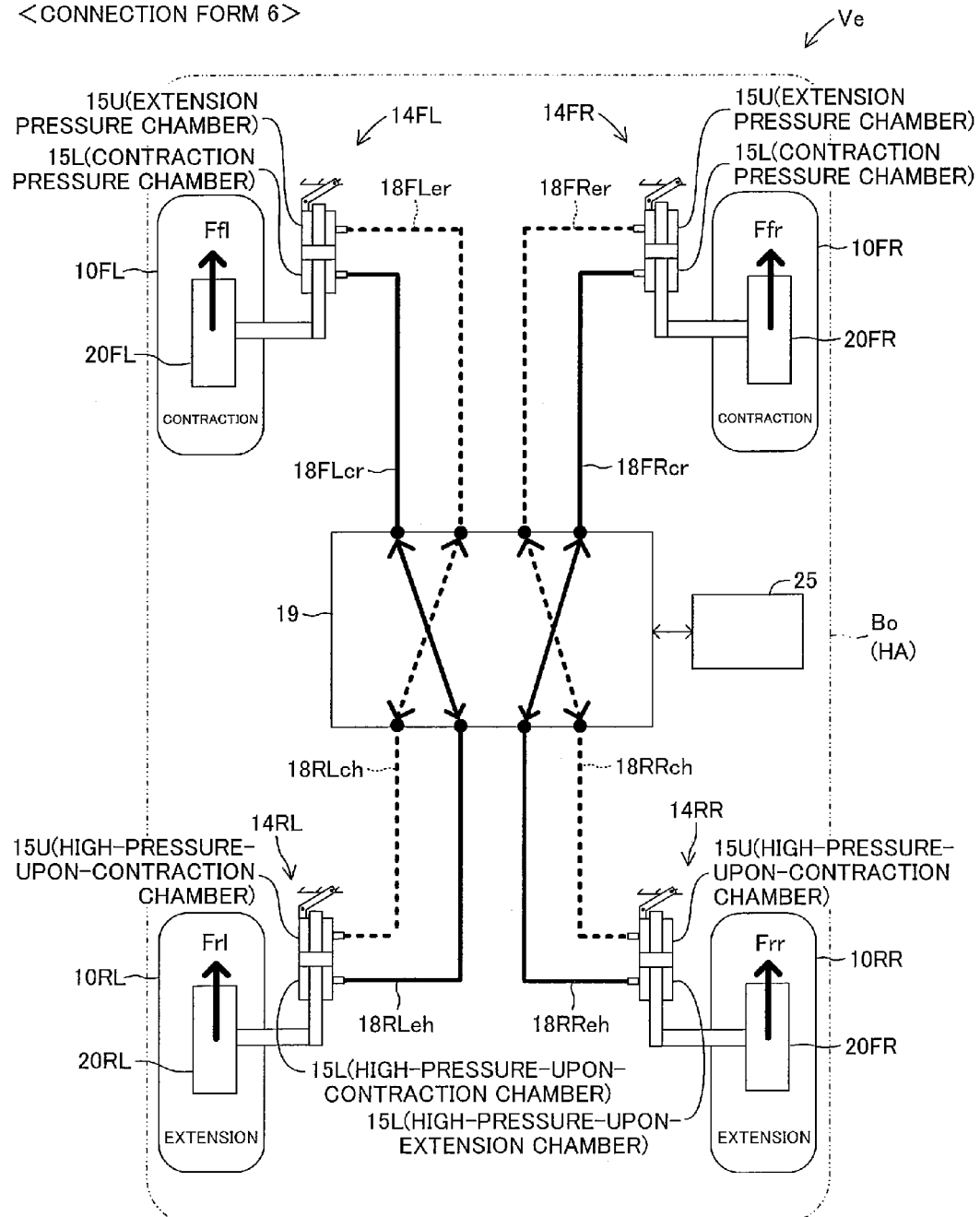
FIG. 11 is a schematic diagram illustrating a connection form 6 among the respective fluid pressure cylinders via the direction control circuit according to the embodiment of the present invention.

As illustrated in FIG. 11, a connection form 6 is a connection form between the fluid pressure cylinders 14RL and 14RR (hydraulic pressure supplying side) and the fluid pressure cylinders 14FL and 14FR (hydraulic pressure supplied side) for controlling (assisting) the pitch behavior (heave behavior) generated on the body Bo of the traveling vehicle Ve, for example. Specifically, in the connection form 6, as illustrated in FIG. 11, the electronic control unit 25 downward displaces the front side of the body Bo (displaces toward the contraction direction with respect to the road surface), and upward displaces the rear side of the body Bo (displaces toward the extension direction with respect to the road surface), thereby controlling the behavior of the body Bo.

Thus, the electronic control unit 25 controls the rotations of the respective in-wheel motors 20 via the inverter 21, and, as illustrated in FIG. 11, generates the respective braking/driving forces Ffl, Ffr, Frl, and Frr of the front left and right wheel 10FL and 10FR and the rear left and right wheels 10RL and 10RR as the driving forces same in magnitude. In this manner, downward vertical forces caused by reaction forces of the suspension mechanisms 11FL and 11FR act on the front side of the body Bo (vehicle Ve), resulting in a downward displacement (namely, displacement toward the contraction direction) of the front side of the body Bo. On the other hand, upward vertical forces caused by reaction forces of the suspension mechanisms 11RL and 11RR act on the rear side of the body Bo (vehicle Ve), resulting in an upward displacement (namely, displacement toward the extension direction) of the rear side of the body Bo.

Moreover, the electronic control unit 25 controls opening/closing of respective direction control valves constructing the direction control circuit 19, and, as illustrated in FIG. 11, on the left side of the body Bo (vehicle Ve), connects the pipeline 18RLch (broken line) connected to the high-pressure-upon-contraction chamber 15U of the fluid pressure cylinder 14RL on the hydraulic pressure supplying side and the pipeline 18FLer (broken line) connected to the extension pressure chamber 15U of the fluid pressure cylinder 14FL on the hydraulic pressure supplied side to each other for communication. Similarly, as illustrated in FIG. 11, the electronic control unit 25 connects the pipeline 18RLeh (solid line) connected to the high-pressure-upon-extension chamber 15L of the fluid pressure cylinder 14RL on the hydraulic pressure supplying side and the pipeline 18FLcr (solid line) connected to the contraction pressure chamber 15L of the fluid pressure cylinder 14FL on the hydraulic pressure supplied side to each other for communication.

On the other hand, as illustrated in FIG. 11, the electronic control unit 25 connects, on the right side of the body Bo (vehicle Ve), the pipeline 10RRch (broken line) connected to the high-pressure-upon-contraction chamber 15U of the fluid pressure cylinder 14RR on the hydraulic pressure supplying side and the pipeline 18FRer (broken line) connected to the extension pressure chamber 15U of the fluid pressure cylinder 14FR on the hydraulic pressure supplied side to each other for communication. Similarly, as illustrated in FIG. 11, the electronic control unit 25 connects the pipeline 18RReh (solid line) connected to the high-pressure-upon-extension chamber 15L of the fluid pressure cylinder 14RR on the hydraulic pressure supplying side and the pipeline 18FRcr (solid line) connected to the contraction pressure chamber 15L of the fluid pressure cylinder 14FR on the hydraulic pressure supplied side to each other for communication.

In the connection form 6, the electronic control unit 25 independently applies the driving control to the in-wheel motors 20FL, 20FR, 20RL, and 20RR, thereby generating the braking/driving forces Ffl and Ffr corresponding to driving forces on the front left and right wheels 10FL and 10FR to displace the front side of the body Bo toward the contraction direction, and generating the braking/driving forces Frl and Frr corresponding to driving forces on the rear left and right wheels 10RL and 10RR to displace the rear side of the body Bo toward the extension direction. In this manner, the hydraulic pressures in the high-pressure-upon-extension chambers 15L of the fluid pressure cylinders 14RL and 14RR increase as the rear side of the body Bo is actively displaced toward the extension direction.

Then, in this connection form 6, the hydraulic pressure increased in the high-pressure-upon-extension chamber 15L of the fluid pressure cylinder 14RL is supplied to the contraction pressure chamber 15L of the fluid pressure cylinder 14FL communicating via the pipeline 18RLch, the direction control circuit 19, and the pipeline 18FLer, and the hydraulic pressure increased in the high-pressure-upon-extension chamber 15L of the fluid pressure cylinder 14RR is supplied to the contraction pressure chamber 15L of the fluid pressure cylinder 14FR communicating via the pipeline 18RReh, the direction control circuit 19, and the pipeline 18FRcr. In this manner, as the hydraulic pressures in the contraction pressure chambers 15L increase in the fluid pressure cylinders 14FL and 14FR, the fluid pressure cylinders 14FL and 14FR can contract between the body Bo (sprung member HA) and the unsprung member LA, thereby downward displacing the front side of the body Bo.

In the description given above, the case where the front side of the body Bo (vehicle Ve) is displaced downward and the rear side of the body Bo (vehicle Ve) is displaced upward has been exemplified. However, it should be understood that the connection form 6 includes a case where the front side of the body Bo (vehicle Ve) is displaced upward and the rear side of the body Bo (vehicle Ve) is displaced downward. In this case, as illustrated in FIG. 11, the hydraulic pressure increased in the high-pressure-upon-contraction chamber 15U of the fluid pressure cylinder 14RL is supplied to the extension pressure chamber 15U of the fluid pressure cylinder 14FL communicating via the pipeline 18RLch, the direction control circuit 19, and the pipeline 18FLer, and the hydraulic pressure increased in the high-pressure-upon-contraction chamber 15U of the fluid pressure cylinder 14RR is supplied to the extension pressure chamber 15U of the fluid pressure cylinder 14FR communicating via the pipeline 18RRch, the direction control circuit 19, and the pipeline 18FRer. In this manner, as the hydraulic pressures in the extension pressure chambers 15U increase in the fluid pressure cylinders 14FL and 14FR, the fluid pressure cylinders 14FL and 14FR can extend between the body Bo (sprung member HA) and the unsprung member LA, thereby upward displacing the front side of the body Bo.

Thus, in the connection form 6, even when the magnitudes of the braking/driving forces Ffl, Ffr, Frl, and Frr (motor torques of the respective in-wheel motors 20) on the respective wheels 10 are equalized, the pitch behavior of the body Bo can be appropriately controlled (assisted) by using the vertical forces by the fluid pressure cylinders 14FL and 14FR.

Moreover, when the in-wheel motors 20RL and 20RR are controlled for driving to displace the rear left wheel 10RL side of the body Bo toward the extension direction (or contraction direction) and to displace the rear right wheel 10RR side of the body Bo toward the contraction direction (or extension direction), the hydraulic pressure in the high-pressure-upon-extension chamber 15L (or high-pressure-upon-contraction chamber 15U) of the fluid pressure cylinder 14RL increases and the hydraulic pressure in the high-pressure-upon-contraction chamber 15U (or high-pressure-upon-extension chamber 15L) of the fluid pressure cylinder 14RR increases. Then, in the connection form 6, the hydraulic pressure (high pressure) from the high-pressure-upon-extension chamber 15L (or high-pressure-upon-contraction chamber 15U) of the fluid pressure cylinder 14RL is supplied to the contraction pressure chamber 15L (or extension pressure chamber 15U) of the fluid pressure cylinder 14FL, and the hydraulic pressure (high pressure) from the high-pressure-upon-contraction chamber 15U (or high-pressure-upon-extension chamber 15L) of the fluid pressure cylinder 14RR is supplied to the extension pressure chamber 15U (or contraction pressure chamber 15L) of the fluid pressure cylinder 14FR.

In this manner, the hydraulic pressure in the contraction pressure chamber 15L (or extension pressure chamber 15U) increases in the fluid pressure cylinder 14FL in contrast to the extension (contraction) of the fluid pressure cylinder 14RL, and the hydraulic pressure in the extension pressure chamber 15U (or contraction pressure chamber 15L) increases in the fluid pressure cylinder 14FR in contrast to the contraction (extension) of the fluid pressure cylinder 14RR. Therefore, in an opposite phase of the fluid pressure cylinder 14RL, the fluid pressure cylinder 14FL contracts (or extends) between the body Bo (sprung member HA) and the unsprung member LA, thereby displacing the front left side of the body Bo downward (upward), and in a phase opposite to the fluid pressure cylinder 14RR, the fluid pressure cylinder 14FR extends (or contracts) between the body Bo (sprung member HA) and the unsprung member LA, thereby displacing the front right side of the body Bo upward (downward). Thus, in the connection form 6, the fluid pressure cylinders can be displaced in opposite phases between the front side and the rear side of the body Bo (vehicle) so that the roll behavior of the body Bo can be appropriately controlled (restrained). Further, the control of the pitch behavior (maintenance of the vehicle height) in the above-mentioned way can also provide an effect of appropriately controlling the heave behavior.

(7) Connection Form 7

Figure 12:
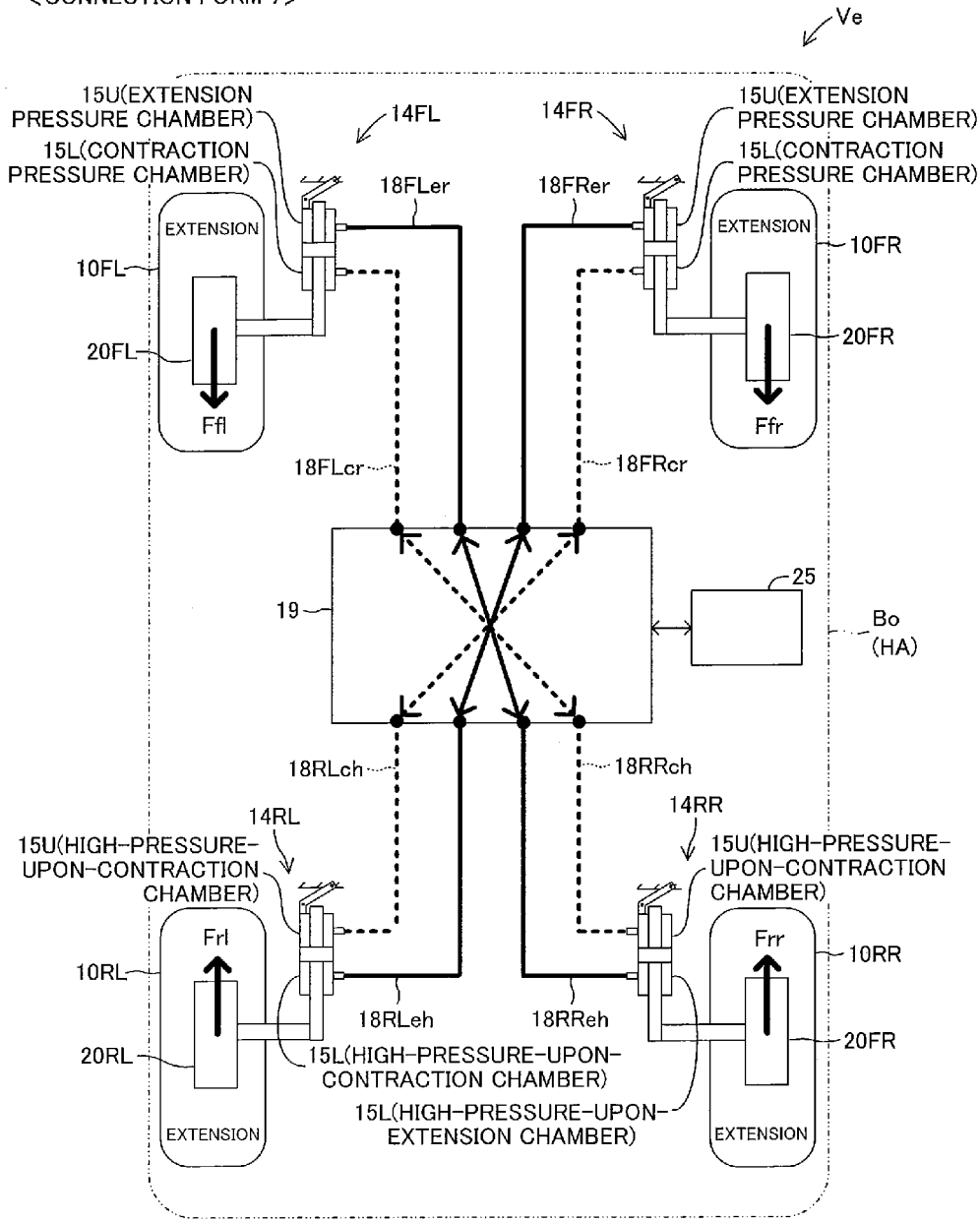
FIG. 12 is a schematic diagram illustrating a connection form 7 among the respective fluid pressure cylinders via the direction control circuit according to the embodiment of the present invention.

As illustrated in FIG. 12, a connection form 7 is a connection form between the fluid pressure cylinders 14RL and 14RR (hydraulic pressure supplying side) and the fluid pressure cylinders 14FL and 14FR (hydraulic pressure supplied side) for controlling (assisting) the heave behavior generated on the body Bo of the traveling vehicle Ve, for example. Specifically, in the connection form 7, as illustrated in FIG. 12, the electronic control unit 25 displaces the front side and the rear side of the body Bo in the vertically same direction (displaces toward the extension direction or the contraction direction with respect to the road surface), thereby controlling the heave behavior of the body Bo.

Therefore, the electronic control unit 25 controls the rotations of the respective in-wheel motors 20 via the inverter 21 or controls the brake mechanisms 23 via the brake actuator 24 to generate, as illustrated in FIG. 12, the respective braking/driving forces Ffl and Ffr on the front left and right wheels 10FL and 10RR as relative braking forces and the respective braking/driving forces Frl and Frr on the rear left and right wheels 10RL and 10RR as relative driving forces. Note that, the respective braking/driving forces Ffl, Ffr, Frl, and Frr on the front left and right wheels 10FL and 10FR and the rear left and right wheels 10RL and 10RR are the same in magnitude. As a result, upward vertical forces caused by reaction forces of the suspension mechanisms 11FL and 11FR act on the front side of the body Bo (vehicle Ve), resulting in an upward displacement (namely, displacement toward the extension direction) of the front side of the body Bo. On the other hand, upward vertical forces caused by reaction forces of the suspension mechanisms 11RL and 11RR act on the rear side of the body Bo (vehicle Ve), resulting in an upward displacement (namely, displacement toward the extension direction) of the rear side of the body Bo.

Moreover, the electronic control unit 25 controls the opening/closing of the respective direction control valves constructing the direction control circuit 19 to connect, as illustrated in FIG. 12, diagonal positions of the body Bo (vehicle Ve) to each other, in other words, to connect the fluid pressure cylinder 14FL located at the front left wheel 10FL and the fluid pressure cylinder 14RR located at the rear right wheel 10RR to each other, and to connect the fluid pressure cylinder 14FR located at the front right wheel 10FR and the fluid pressure cylinder 14RL located at the rear left wheel 10RL to each other. Specifically, as illustrated in FIG. 12, the electronic control unit 25 connects the pipeline 18RLch (broken line) connected to the high-pressure-upon-contraction chamber 15U of the fluid pressure cylinder 14RL on the hydraulic pressure supplying side and the pipeline 18FRcr (broken line), which is arranged diagonally to the pipeline 18RLch and is connected to the contraction pressure chamber 15L of the fluid pressure cylinder 14FR on the hydraulic pressure supplied side, to each other for communication. Similarly, as illustrated in FIG. 12, the electronic control unit 25 connects the pipeline 18RLeh (solid line) connected to the high-pressure-upon-extension chamber 15L of the fluid pressure cylinder 14RL on the hydraulic pressure supplying side and the pipeline 18FRer (solid line) connected to the extension pressure chamber 15U of the fluid pressure cylinder 14FR on the hydraulic pressure supplied side to each other for communication.

On the other hand, as illustrated in FIG. 12, the electronic control unit 25 connects the pipeline 18RRch (broken line) connected to the high-pressure-upon-contraction chamber 15U of the fluid pressure cylinder 14RR on the hydraulic pressure supplying side and the pipeline 18FLcr (broken line) connected to the contraction pressure chamber 15L of the fluid pressure cylinder 14FL on the hydraulic pressure supplied side to each other for communication. Similarly, as illustrated in FIG. 12, the electronic control unit 25 connects the pipeline 18RReh (solid line) connected to the high-pressure-upon-extension chamber 15L of the fluid pressure cylinder 14RR on the hydraulic pressure supplying side and the pipeline 18FLer (solid line) connected to the extension pressure chamber 15U of the fluid pressure cylinder 14FL on the hydraulic pressure supplied side to each other for communication.

In the connection form 7, the electronic control unit 25 independently applies the driving control to the in-wheel motors, 20FL, 20 FR, 20RL, and 20RR, thereby generating the braking/driving forces Ffl and Ffr corresponding to braking forces on the rear left and right wheels 10FL and 10FR to displace the front side of the body Bo toward the extension direction, and generating the braking/driving forces Frl and Frr corresponding to driving forces on the rear left and right wheels 10RL and 10RR to displace the rear side of the body Bo toward the extension direction. In this manner, the hydraulic pressure in the high-pressure-upon-extension chambers 15L of the fluid pressure cylinders 14RL and 14RR increase as the rear side of the body Bo is actively displaced toward the extension direction.

Then, in the connection form 7, the hydraulic pressure increased in the high-pressure-upon-extension chamber 15L of the fluid pressure cylinder 14RL is supplied to the extension pressure chamber 15U of the fluid pressure cylinder 14FR communicating via the pipeline 18RLeh, the direction control circuit 19, and the pipeline 18FRer, and the hydraulic pressure increased in the high-pressure-upon-extension chamber 15L of the fluid pressure cylinder 14RR is supplied to the extension pressure chamber 15U of the fluid pressure cylinder 14FL communicating via the pipeline 18RReh, the direction control circuit 19, and the pipeline 18FLer. In this manner, as the hydraulic pressures in the extension pressure chambers 15U increase in the fluid pressure cylinders 14FL and 14FR, the fluid pressure cylinders 14FL and 14FR can extend between the body Bo (sprung member HA) and the unsprung member LA, thereby upward displacing the front side of the body Bo.

In the description given above, the case where the rear side of the body Bo (vehicle Ve) is actively displaced upward and the front side of the body Bo (vehicle Ve) is accordingly displaced upward has been exemplified. However, it should be understood that the connection form 7 includes a case where the rear side of the body Bo (vehicle Ve) is actively displaced downward and the front side of the body Bo (vehicle Ve) is accordingly displaced downward. In this case, as illustrated in FIG. 12, the hydraulic pressure increased in the high-pressure-upon-contraction chamber 15U of the fluid pressure cylinder 14RL is supplied to the contraction pressure chamber 15L of the fluid pressure cylinder 14FR communicating via the pipeline 18RLch, the direction control circuit 19, and the pipeline 18FRcr, and the hydraulic pressure increased in the high-pressure-upon-contraction chamber 15U of the fluid pressure cylinder 14RR is supplied to the contraction pressure chamber 15L of the fluid pressure cylinder 14FL communicating via the pipeline 18RRch, the direction control circuit 19, and the pipeline 18FLcr. In this manner, as the hydraulic pressures in the contraction pressure chambers 15L increase in the fluid pressure cylinders 14FL and 14FR, the fluid pressure cylinders 14FL and 14FR can contract between the body Bo (sprung member HA) and the unsprung member LA, thereby downward displacing the front side of the body Bo.

Thus, in the connection form 7, even when the magnitudes of the braking/driving forces Ffl, Ffr, Frl, and Frr (motor torques of the respective in-wheel motors 20) on the respective wheels 10 are equalized, the heave behavior of the body Bo can be appropriately controlled (assisted) by using the vertical forces by the fluid pressure cylinders 14FL and 14FR.

Moreover, when the in-wheel motors 20RL and 20RR are controlled for driving to displace the rear left wheel 10RL side of the body Bo toward the extension direction (or contraction direction) and to displace the rear right wheel 10RR side of the body Bo toward the contraction direction (or extension direction), the hydraulic pressure in the high-pressure-upon-extension chamber 15L (or high-pressure-upon-contraction chamber 15U) of the fluid pressure cylinder 14RL increases and the hydraulic pressure in the high-pressure-upon-contraction chamber 15U (or high-pressure-upon-extension chamber 15L) of the fluid pressure cylinder 14RR increases. Then, in the connection form 7, the hydraulic pressure (high pressure) from the high-pressure-upon-extension chamber 15L (or high-pressure-upon-contraction chamber 15U) of the fluid pressure cylinder 14RL is supplied to the extension pressure chamber 15U (or contraction pressure chamber 15L) of the fluid pressure cylinder 14FR arranged at the diagonal position of the fluid pressure cylinder 14RL, and the hydraulic pressure (high pressure) from the high-pressure-upon-contraction chamber 15U (or high-pressure-upon-extension chamber 15L) of the fluid pressure cylinder 14RR is supplied to the contraction pressure chamber 15L (or extension pressure chamber 15U) of the fluid pressure cylinder 14FL arranged at the diagonal position of the fluid pressure cylinder 14RR.

In this manner, the hydraulic pressure in the extension pressure chamber 15U (or contraction pressure chamber 15L) increases in the fluid pressure cylinder 14FR as the fluid pressure cylinder 14RL extends (contracts), and the hydraulic pressure in the contraction pressure chamber 15L (or extension pressure chamber 15U) increases in the fluid pressure cylinder 14FL as the fluid pressure cylinder 14RR contracts (extends). Therefore, in an opposite phase of the fluid pressure cylinder 14RR, the fluid pressure cylinder 14FR extends (or contracts) between the body Bo (sprung member HA) and the unsprung member LA, thereby displacing the front right side of the body Bo upward (or downward), and in an opposite phase of the fluid pressure cylinder 14RL, the fluid pressure cylinder 14FL contracts (or extends) between the body Bo (sprung member HA) and the unsprung member LA, thereby displacing the front left side of the body Bo downward (upward). Thus, in the connection form 7, the fluid pressure cylinders can be displaced in opposite phases between the front side and the rear side of the body Bo (vehicle) so that the roll behavior of the body Bo can be appropriately controlled (restrained). Further, the control of the heave behavior in the above-mentioned way can also provide an effect of, for example, restraining an attitude change caused by a useless pitch behavior generated on the body Bo (sprung member HA) caused by the driving control for the in-wheel motors 20.

(8) Connection Form 8

Figure 13:
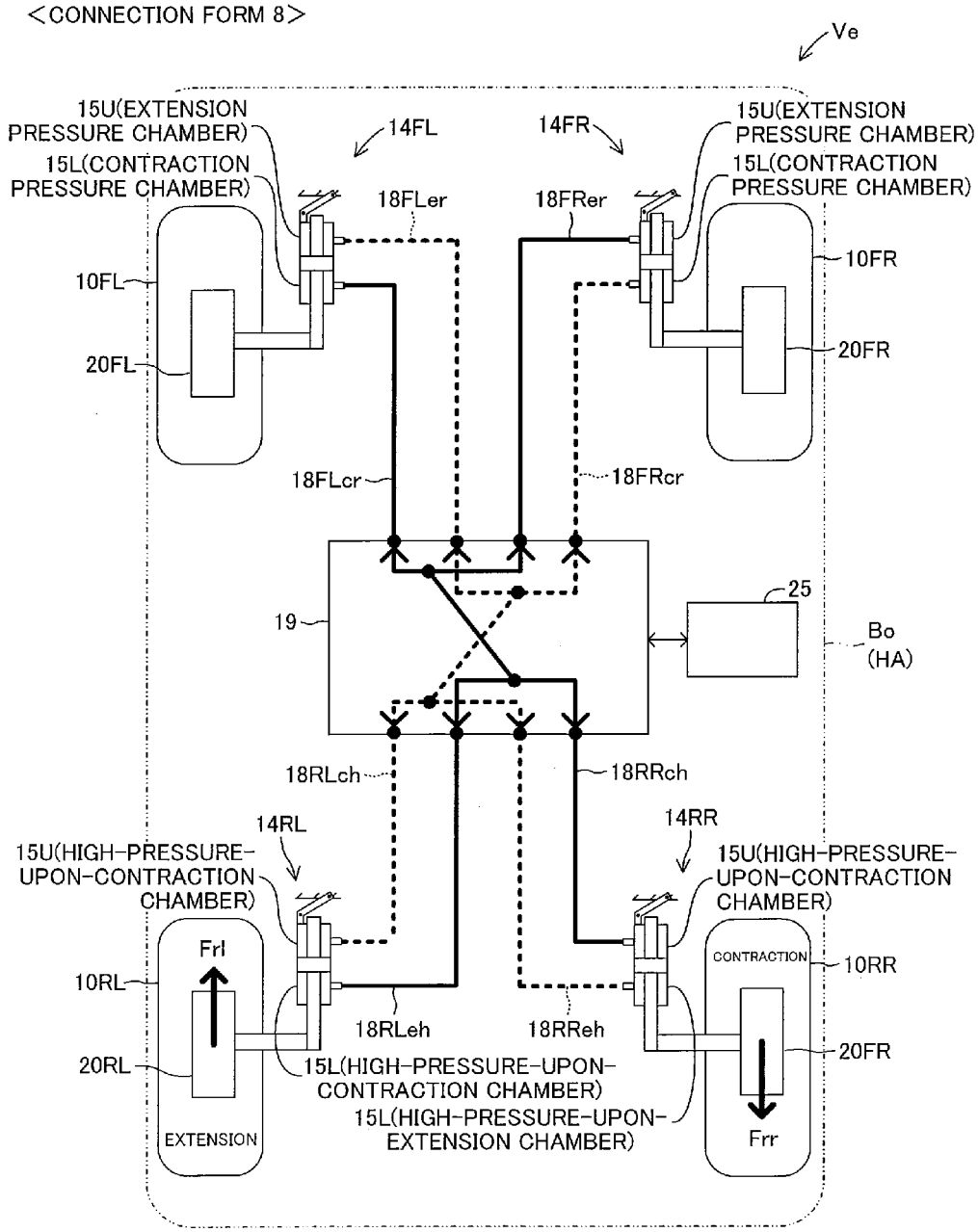
FIG. 13 is a schematic diagram illustrating a connection form 8 among the respective fluid pressure cylinders via the direction control circuit according to the embodiment of the present invention.

As illustrated in FIG. 13, a connection form 8 is a connection form between the fluid pressure cylinders 14RL and 14RR (hydraulic pressure supplying side) and the fluid pressure cylinders 14FL and 14FR (hydraulic pressure supplied side) for controlling (restraining) the roll behavior generated on the body Bo of the vehicle Ve, for example, in a turning state. Specifically, in the connection form 8, as illustrated in FIG. 13, the electronic control unit 25 controls the behavior of the body Bo as follows. The electronic control unit 25 upward displaces the rear left side of the body Bo (displaces toward the extension direction with respect to the road surface) and downward displaces the rear right side of the body Bo (displaces toward the contraction direction with respect to the road surface). Meanwhile, the electronic unit 25 downward displaces the front left side of the body Bo (displaces toward the contraction direction with respect to the road surface) and upward displaces the front right side of the body Bo (displaces toward the extension direction with respect to the road surface).

Therefore, the electronic control unit 25 controls the rotations of the respective in-wheel motors 20 via the inverter 21 or controls the brake mechanisms 23 via the brake actuator 24 to generate, as illustrated in FIG. 13, the rear left braking/driving force Frl on the rear left wheel 10RL as a relative driving force, and the rear right breaking/driving force Frr on the rear right wheel 10RR as a relative braking force. In this manner, an upward vertical force caused by a reaction force of the suspension mechanism 11RL acts on the rear left side of the body Bo (vehicle Ve), resulting in an upward displacement (namely, displacement toward the extension direction) of the rear left side of the body Bo, and a downward vertical force caused by a reaction force of the suspension mechanism 11RR acts on the rear right side of the body Bo (vehicle Ve), resulting in a downward displacement (namely, displacement toward the contraction direction) of the rear right side of the body Bo. Note that, the respective braking/driving forces Frl and Frr on the rear left and right wheels 10RL and 10RR are the same in magnitude.

Moreover, the electronic control unit 25 controls the opening/closing of the respective direction control valves constructing the direction control circuit 19 to connect, as illustrated in FIG. 13, for the left and right sides of the body Bo (vehicle Ve), the fluid pressure cylinder 14RL located at the rear left wheel 10RL and the fluid pressure cylinder 14RR located at the rear right wheel 10RR to each other, and the fluid pressure cylinder 14FL located at the front left wheel 10FL and the fluid pressure cylinder 14FR located at the front right wheel 10FR to each other. Further, as illustrated in FIG. 13, for the front and rear sides of the body Bo (vehicle Ve), the electronic control unit 25 connects, to each other, the fluid pressure cylinders 14RL and 14RR connected to each other and the fluid pressure cylinders 14FL and 14FR connected to each other.

Specifically, as illustrated in FIG. 13, regarding the fluid pressure cylinders 14RL and 14RR on the hydraulic pressure supplying side, the electronic control unit 25 connects the pipeline 18RLch (broken line) connected to the high-pressure-upon-contraction chamber 15U of the fluid pressure cylinder 14RL and the pipeline 18RReh (broken line) connected to the high-pressure-upon-extension chamber 15L of the fluid pressure cylinder 14RR to each other via the high-pressure-upon-contraction and extension chamber connection pipelines for communication. Moreover, the electronic control unit 25 connects the pipeline 18RLeh (solid line) connected to the high-pressure-upon-extension chamber 15L of the fluid pressure cylinder 14RL and the pipeline 18RRch (solid line) connected to the high-pressure-upon-contraction chamber 15U of the fluid pressure cylinder 14RR to each other via the high-pressure-upon-extension and contraction chamber connection pipelines for communication.

Moreover, as illustrated in FIG. 13, regarding the fluid pressure cylinders 14FL and 14FR on the hydraulic pressure supplied side, the electronic control unit 25 connects the pipeline 18FLcr (solid line) connected to the contraction pressure chamber 15L of the fluid pressure cylinder 14FL and the pipeline 18FRer (solid line) connected to the extension pressure chamber 15U of the fluid pressure cylinder 14FR to each other via the contraction and extension pressure chamber connection pipelines for communication. Moreover, the electronic control unit 25 connects the pipeline 18FLer (broken line) connected to the extension pressure chamber 15U of the fluid pressure cylinder 14FL and the pipeline 18FRcr (broken line) connected to the contraction pressure chamber 15L of the fluid pressure cylinder 14FR to each other via the extension and contraction pressure chamber connection pipelines for communication.

Further, as illustrated in FIG. 13, the electronic control unit 25 connects the high-pressure-upon-contraction and extension chamber connection pipelines (broken line) on the hydraulic pressure supplying side and the extension and contraction pressure chamber connection pipelines (broken line) on the hydraulic pressure supplied side to each other for communication. Further, as illustrated in FIG. 13, the electronic control unit 25 connects the high-pressure-upon-extension and contraction chamber connection pipelines (solid line) on the hydraulic pressure supplying side and the contraction and extension pressure chamber connection pipelines (solid line) on the hydraulic pressure supplied side to each other for communication.

In the connection form 8, the electronic control unit 25 independently applies the driving control to the in-wheel motors 20RL and 20RR, thereby generating the braking/driving force Frl corresponding to driving force on the rear left wheel 10RL to displace the rear left side of the body Bo toward the extension direction, and generating the braking/driving force Frr corresponding to braking force on the rear right wheel 10RR to displace the rear right side of the body Bo toward the contraction direction. In this manner, the hydraulic pressure in the high-pressure-upon-extension chamber 15L of the fluid pressure cylinder 14RL increases as the rear left side of the body Bo is actively displaced toward the extension direction, and the hydraulic pressure in the high-pressure-upon-contraction chamber 15U of the fluid pressure cylinder 14RR increases as the rear right side of the body Bo is actively displaced toward the contraction direction.

Then, in the connection form 8, the hydraulic pressure increased in the high-pressure-upon-extension chamber 15L of the fluid pressure cylinder 14RL and the hydraulic pressure increased in the high-pressure-upon-contraction chamber 15L of the fluid pressure cylinder 14RR are supplied to the contraction pressure chambers 15L of the fluid pressure cylinder 14FL and the extension pressure chambers 15U of the fluid pressure cylinder 14FR communicating via the pipeline 18RLeh, the pipeline 18RRch, the direction control circuit 19, the pipeline 18FLcr, and the pipeline 18FRer. In this manner, as the hydraulic pressure in the contraction pressure chamber 15L increases in the fluid pressure cylinder 14FL, the fluid pressure cylinder 14FL can contract between the body Bo (sprung member HA) and the unsprung member LA, thereby downward displacing the front left side of the body Bo. On the other hand, as the hydraulic pressure in the extension pressure chamber 15U increases in the fluid pressure cylinder 14FR, the fluid pressure cylinder 14FR can extend between the body Bo (sprung member HA) and the unsprung member LA, thereby upward displacing the front right side of the body Bo.

In the description given above, the case where the rear left side of the body Bo (vehicle Ve) is displaced upward and the rear right side of the body Bo (vehicle Ve) is displaced downward has been exemplified. However, it should be understood that the connection form 8 includes a case where the rear left side of the body Bo (vehicle Ve) is displaced downward and the rear right side of the body Bo (vehicle Ve) is displaced upward. In this case, as illustrated in FIG. 13, the hydraulic pressure increased in the high-pressure-upon-contraction chamber 15U of the fluid pressure cylinder 14RL and the hydraulic pressure increased in the high-pressure-upon-extension chamber 15L of the fluid pressure cylinder 14RR are supplied to the extension pressure chamber 15U of the fluid pressure cylinder 14FL and the contraction pressure chamber 15L of the fluid pressure cylinder 14FR communicating via the pipeline 18RLch, the pipeline 18RReh, the direction control circuit 19, the pipeline 18FLer, and the pipeline 18FRcr. In this manner, as the hydraulic pressure in the extension pressure chamber 15U increases in the fluid pressure cylinder 14FL, the fluid pressure cylinder 14FL can extend between the body Bo (sprung member HA) and the unsprung member LA, thereby upward displacing the front left side of the body Bo. On the other hand, as the hydraulic pressure in the contraction pressure chamber 15L increases in the fluid pressure cylinder 14FR, the fluid pressure cylinder 14FR can contract between the body Bo (sprung member HA) and the unsprung member LA, thereby downward displacing the front right side of the body Bo.

Thus, in the connection form 8, even when the magnitudes of the braking/driving forces Frl and Frr (motor torques of the in-wheel motors 20RL and 20RR) on the rear left and right wheels 10RL and 10RR are equalized, the front side of the body Bo can be displaced in a phase opposite to the rear side of the body Bo by using the vertical forces of the fluid pressure cylinders 14FL and 14FR, thereby appropriately controlling (restraining) the roll behavior.

Figure 14:
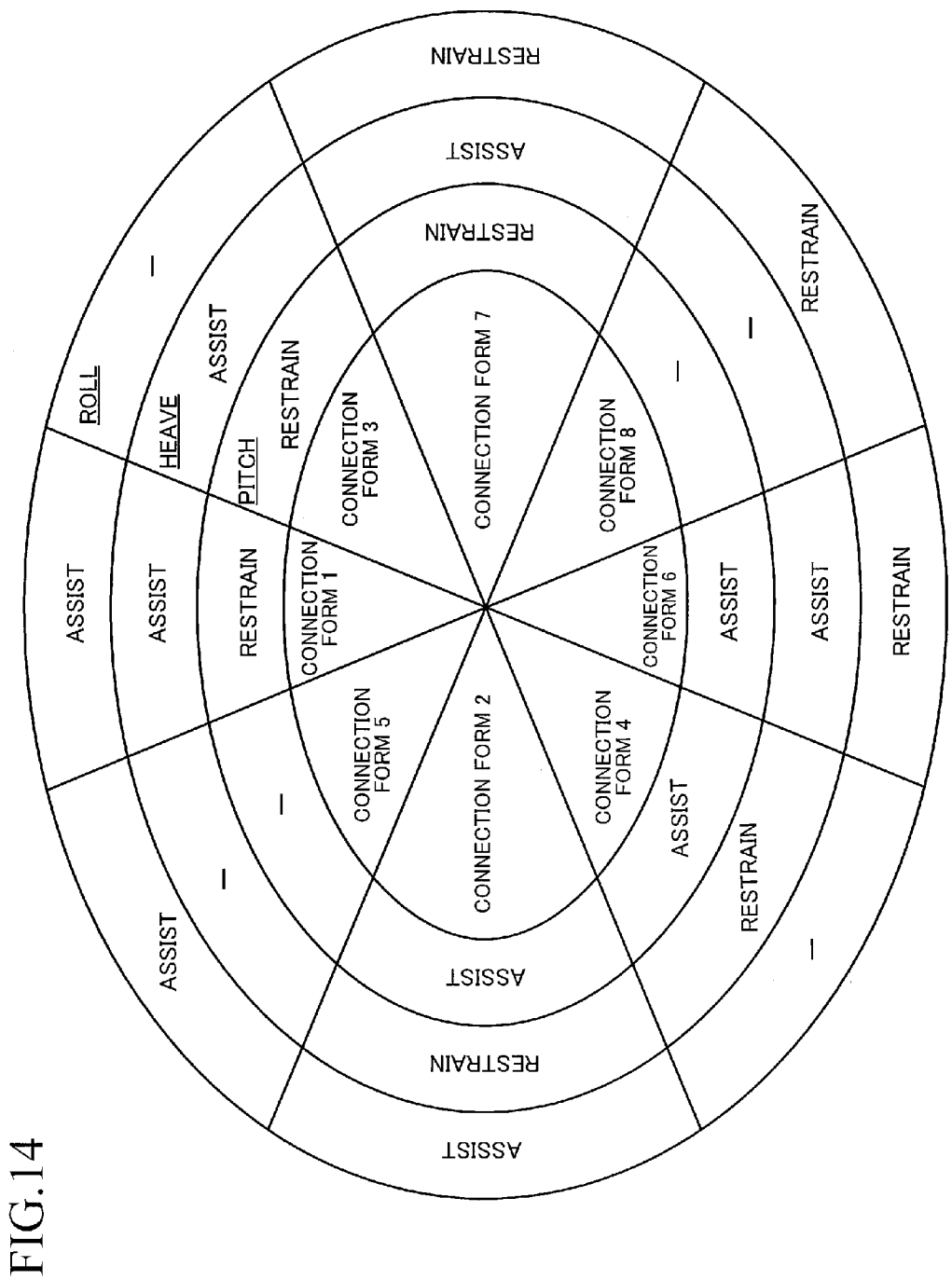
FIG. 14 is a diagram illustrating a relationship among effects of the behavior control by the connection forms 1 to 9 among the respective fluid pressure cylinders via the direction control circuit according to the embodiment of the present invention.

FIG. 14 illustrates summarized control effects (namely, whether each of the effects assists or restrains the behaviors) for the heave behavior, the pitch behavior, and the roll behavior in the connection forms of the connection form 1 to the connection form 8. On this occasion, as apparent from FIG. 14, regarding the respective control effects, the connection form 1 and the connection form 6, the connection form 2 and the connection form 7, the connection form 3 and the connection form 4, and the connection form 5 and the connection form 8 are each in a front/rear relationship (facing relationship).

Thus, the electronic control unit 25 can appropriately switch the connection forms 1 to 8 based on the relationships, for example, depending on a change in behavior generated on the body Bo (vehicle Ve). On this occasion, when the electronic control unit 25 switches via the direction control circuit 19 the connection form based on the relationships, in other words, from the state of assisting the behavior to the state of restraining the behavior or from the state of restraining the behavior to the state of assisting the behavior as the control effects, a state (connection state) corresponding to neither the state of assisting the behavior (connection form) nor the state of restraining the behavior (connection form) can be interposed for the switching from the state of restraining the behavior to the state of assisting the behavior. In this case, the state (connection state) corresponding to neither the state of assisting the behavior (connection form) nor the state of restraining the behavior (connection form) may be, for example, the connection forms next to each other in the above-mentioned relationships, or a state in which a reservoir (not shown) and the respective fluid pressure cylinders 14 are once communicated to each other. In this manner, a sense of discomfort caused by the switching of the connection form and observed by the driver can be appropriately reduced.

As can be understood from the description given above, according to the embodiment described above, owing to the difference in suspension geometry between the suspension mechanisms 11FL and 11FR for coupling the front left and right wheels 10FL and 10FR to the body Bo and the suspension mechanisms 11RL and 11RR for coupling the rear left and right wheels 10RL and 10RR to the body Bo, vertical forces acting on the body as the component forces of the braking/driving forces Ffl, Ffr, Frl, and Frr to be generated on the respective wheels 10FL, 10FR, 10RL, and 10RR by the in-wheel motors 20FL, 20FR, 20RL, and 20RR and the brake mechanisms 23FL, 23FR, 23RL, and 23RR are large. Thus, the fluid pressure cylinders 14RL and 14RR on the hydraulic pressure supplying side, which are arranged on the side of the rear left and right wheels 10RL and 10RR having a margin in the vertical force for controlling the pitch behavior, the heave behavior, and the roll behavior generated on the body Bo, can convert the vertical forces (in other words, translational forces) acting on the body Bo into the hydraulic pressures (high pressures) to supply the fluid pressure cylinders 14FL and 14FR on the hydraulic pressure supplied side arranged on the side of the rear left and right wheels 10FL and 10FR with the hydraulic pressures. In other words, the fluid pressure cylinders 14RL and 14RR on the hydraulic pressure supplying side can supply the hydraulic pressures to the fluid pressure cylinders 14FL and 14FR on the hydraulic pressure supplied side, which have a small vertical force acting on the body Bo and are arranged on the side of the rear left and right wheels 10FL and 10FR insufficient in the vertical force for controlling the pitch behavior, the heave behavior, and the roll behavior generated on the body Bo.

In this manner, the fluid pressure cylinders 14FL and 14FR on the fluid pressure supplied side can receive the hydraulic pressures (high pressures) supplied from the fluid pressure cylinders 14RL and 14RR on the fluid pressure supplying side to convert the hydraulic pressures into the vertical forces (in other words, translational forces) to be applied to the body Bo, to thereby apply the converted vertical forces to the body Bo. Thus, on the side of the rear left and right wheels 10FL and 10FR insufficient in vertical force for controlling the behavior generated on the body Bo, in addition to the vertical forces acting on the body Bo as the component forces of the braking/driving forces Ffl and Ffr by the in-wheel motors 20FL and 20FR, the fluid pressure cylinders 14FL and 14FR on the hydraulic pressure supplied side can apply the vertical forces acquired by converting the hydraulic pressures supplied from the fluid pressure cylinders 14RL and 14RR on the hydraulic pressure supplying side to the body Bo. Thus, the insufficiency in the vertical force required for controlling the behavior generated on the body Bo can be eliminated. As a result, the pitch behavior, the heave behavior, and the roll behavior generated on the body can be appropriately controlled (the generation of the behaviors can be assisted or restrained).

Moreover, the fluid pressure cylinders 14FL and 14FR on the hydraulic pressure supplied side can convert the hydraulic pressures (high pressures) supplied from the fluid pressure cylinders 14RL and 14RR on the hydraulic pressure supplying side, thereby applying the vertical forces to the body Bo. Therefore, the magnitudes of the braking/driving forces Ffl, Ffr, Frl, and Frr generated by the in-wheel motors 20FL, 20FR, 20RL, and 20RR on the respective wheels 10FL, 10FR, 10RL, and 10RR can be equalized. As a result, a total electric power amount consumed by the in-wheel motors 20FL, 20FR, 20RL, and 20RR can be reduced.

In carrying out the present invention, the present invention is not limited to the above-mentioned embodiment and various modifications can be made thereto without departing from an object of the present invention.

For example, as illustrated in FIG. 1, the embodiment is carried out in the following way. The fluid pressure cylinders 14FL, 14FR, 14RL, and 14RR are provided at the locations close to the respective wheels 10FL, 10FR, 10RL, and 10RR, and the fluid pressure cylinders 14RL and 14RR on the hydraulic pressure supplying side convert the vertical forces of the body Bo into the hydraulic pressures (high pressures). Then, the fluid pressure cylinders 14FL and 14FR on the hydraulic pressure supplied side convert the supplied hydraulic pressures (high pressures) into the vertical forces to apply the vertical forces to the body Bo. In this case, the embodiment can be carried out by using the shock absorbers 13 constructing the respective suspension mechanisms 11FL, 11FR, 11RL, and 11RR. In this case, a single-rod/double-acting shock absorber can be employed as the shock absorber 13 to operate in the same way as in the fluid pressure cylinders 14FL, 14FR, 14RL, and 14RR. Therefore, the same effect as that of the above-mentioned embodiment can be obtained.

Moreover, this embodiment is carried out by providing the fluid pressure cylinders 14FL, 14FR, 14RL, and 14RR at the locations close to the respective wheels 10FL, 10FR, 10RL, and 10RR. In this case, for example, the embodiment can be carried out by respectively providing the side of the front left and right wheels 10FL and 10FR and the side of the rear left and right wheels 10RL and 10RR of the vehicle Ve with one fluid pressure cylinder on the hydraulic pressure supplied side and one fluid pressure cylinder on the hydraulic pressure supplying side. In this case, compared with the embodiment, the magnitude of the vertical force applied from the fluid pressure cylinder on the hydraulic pressure supplied side to the body Bo decreases more or less, but the same effect as that of the embodiment can be expected.

Moreover, this embodiment is carried out so that the in-wheel motors 20FL, 20FR, 20RL, and 20RR as the braking/driving force generation mechanisms are respectively assembled to the respective wheels 10FL, 10FR, 10RL, and 10RR. In this case, as long as the driving forces (or braking forces) can be independently generated on the respective wheels 10FL, 10FR, 10RL, and 10RR, the configuration is not limited to the one in which the braking/driving force generation mechanisms (in-wheel motors 20) are assembled to the respective wheels 10FL, 10FR, 10RL, and 10RR, and any configuration can be employed.

In this case, specifically, such a configuration can be employed that the braking/driving force generation mechanisms individually impart predetermined rotational forces to respective axles (unsprung member) supporting the respective wheels 10FL, 10FR, 10RL, and 10RR in a rotatable manner, thereby generating the driving forces (or braking forces) on respective wheels 10FL, 10FR, 10RL, and 10RR. Note that, in a case where the configuration modified in this way is employed, the instantaneous rotation angles θf and θr described above with reference to FIG. 4 in the embodiment are formed by lines connecting between the center points of the axles supporting the respective wheels 10FL, 10FR, 10RL, and 10RR and the instantaneous rotation centers Ckf and Ckr of the respective suspension mechanisms 11FL, 11FR, 11RL, and 11RR, and a horizontal line.

Moreover, in this case, the present invention can also be carried out as follows. In place of individual generation of the driving forces (or braking forces) on the respective four wheels 10FL, 10FR, 10RL, and 10RR, for example, the driving forces (or braking forces) can be independently generated on the two wheels of the front left and right wheels 10FL and 10FR, the driving forces (or braking forces) can be independently generated on the two wheels of the rear left and right wheels 10RL and 10RR, or the driving force (or braking force) can be generated on only one of the wheels 10FL, 10FR, 10RL, and 10RR.

The invention claimed is:

1. A vehicle behavior control apparatus, comprising:
   a braking/driving force generation mechanism for generating a driving force or a braking force on a wheel of a vehicle;
   a suspension mechanism for coupling the wheel arranged at an unsprung position of the vehicle to a body arranged at a sprung position of the vehicle;
   an electronic control unit configured to control the braking/driving force generation mechanism depending on a behavior generated on the body, thereby generating a predetermined driving force or braking force on the wheel;
   a fluid pressure cylinder on a fluid pressure supplying side, which is arranged between the unsprung position and the sprung position in a neighborhood of the wheel having an increase in a vertical force in a vertical direction of the vehicle acting on the body via the suspension mechanism corresponding to the wheel as a component force of the predetermined driving force or braking force generated on the wheel by the braking/driving force generation mechanism, for converting the vertical force acting on the body as the component force of the predetermined driving force or braking force into a fluid pressure to supply the fluid pressure;

the fluid pressure cylinder on the fluid pressure supplying side comprises:
- a high-pressure-upon-extension chamber for converting the vertical force acting on the body as the component force of the predetermined driving force or braking force into the fluid pressure to supply the fluid pressure when the body displaces toward a vehicle top direction with respect to a road surface owing to the vertical force; and
- a high-pressure-upon-contraction chamber for converting the vertical force into the fluid pressure to supply the fluid pressure when the body displaces toward a vehicle bottom direction with respect to the road surface owing to the vertical force;

a fluid pressure cylinder on a fluid pressure supplied side, which is arranged between the unsprung position and the sprung position in a neighborhood of the wheel having a decrease in the vertical force acting on the body via the suspension mechanism corresponding to the wheel and is connected to the fluid pressure cylinder on the fluid pressure supplying side, for converting the fluid pressure supplied from the fluid pressure cylinder on the fluid pressure supplying side into the vertical force in the vertical direction of the vehicle to apply the converted vertical force to the body; and the fluid pressure cylinder on the fluid pressure supplied side comprises:
- an extension pressure chamber for converting the fluid pressure supplied from the fluid pressure cylinder on the fluid pressure supplying side into the vertical force for displacing the body toward the vehicle top direction with respect to the road surface; and
- a contraction pressure chamber for converting the fluid pressure into the vertical force for displacing the body toward the vehicle bottom direction with respect to the road surface;

one of the high-pressure-upon-extension chamber and the high-pressure-upon-contraction chamber included in the fluid pressure cylinder on the fluid pressure supplying side and one of the extension pressure chamber and the contraction pressure chamber included in the fluid pressure cylinder on the fluid pressure supplied side are connected to each other;

a control circuit configured to selectively connect or disconnect the one of the high-pressure-upon-extension chamber and the high-pressure-upon-contraction chamber included in the fluid pressure cylinder on the fluid pressure supplying side and the one of the extension pressure chamber and the contraction pressure chamber included in the fluid pressure cylinder on the fluid pressure supplied side to each other, wherein the electronic control unit controls the control circuit depending on the behavior generated on the body to connect the fluid pressure cylinder on the fluid pressure supplying side and the fluid pressure cylinder on the fluid pressure supplied side to each other.

2. A vehicle behavior control apparatus according to claim 1, wherein:

the fluid pressure cylinder on the fluid pressure supplying side is arranged on one of a front wheel side and a rear wheel side of the vehicle, and the fluid pressure cylinder on the fluid pressure supplied side is arranged on another of the front wheel side and the rear wheel side of the vehicle and is connected to the fluid pressure cylinder on the fluid pressure supplying side;

the fluid pressure cylinder on the fluid pressure supplying side converts the vertical force acting on the one of the front wheel side and the rear wheel side of the body as the component force of the predetermined driving force or braking force into the fluid pressure to supply the fluid pressure cylinder on the fluid pressure supplied side connected thereto with the fluid pressure; and the fluid pressure cylinder on the fluid pressure supplied side applies the vertical force acquired by converting the fluid pressure supplied from the fluid pressure cylinder on the fluid pressure supplying side to the another of the front wheel side and the rear wheel side of the body.

3. A vehicle behavior control apparatus according to claim 2, wherein:

the fluid pressure cylinder on the fluid pressure supplying side comprises a plurality of fluid pressure cylinders on the fluid pressure supplying side which are respectively arranged in neighborhoods of left and right wheels of the one of the front wheel side and the rear wheel side of the vehicle, and the fluid pressure cylinder on the fluid pressure supplied side comprises a plurality of fluid pressure cylinders on the fluid pressure supplied side which are respectively arranged in neighborhoods of left and right wheels of the another of the front wheel side and the rear wheel side of the vehicle;

the fluid pressure cylinder on the fluid pressure supplying side and the fluid pressure cylinder on the fluid pressure supplied side arranged on the right wheel side of the vehicle are connected to each other, and the fluid pressure cylinder on the fluid pressure supplying side and the fluid pressure cylinder on the fluid pressure supplied side arranged on the left wheel side of the vehicle are connected to each other;

the fluid pressure cylinders on the fluid pressure supplying side arranged on the right wheel side and the left wheel side of the vehicle respectively convert the vertical forces acting on the right wheel side or the left wheel side of the body as the component forces of the predetermined driving force or braking force into the fluid pressures to supply the fluid pressure cylinders on the fluid pressure supplied side connected thereto with the fluid pressures; and the fluid pressure cylinders on the fluid pressure supplied side arranged on the right wheel side and the left wheel side of the vehicle respectively apply the vertical forces acquired by converting the fluid pressures supplied from the fluid pressure cylinders on the fluid pressure supplying side to the right wheel side or the left wheel side of the body.

4. A vehicle behavior control apparatus according to claim 3, wherein:

the fluid pressure cylinder on the fluid pressure supplying side arranged on the right wheel side of the body and the fluid pressure cylinder on the fluid pressure supplied side arranged on the left wheel side of the body, which is thus arranged at a diagonal position, are connected to each other, and the fluid pressure cylinder on the fluid pressure supplying side arranged on the left wheel side of the body and the fluid pressure cylinder on the fluid pressure supplied side arranged on the right wheel side of the body, which is thus arranged at a diagonal position, are connected to each other;

the fluid pressure cylinders on the fluid pressure supplying side arranged on the right wheel side and the left wheel side of the vehicle respectively convert the vertical forces acting on the right wheel side or the left wheel side of the body as the component forces of the predetermined driving force or braking force into the fluid pressures to supply the fluid pressure cylinders on the fluid pressure supplied side connected thereto, which are arranged at the diagonal positions, with the fluid pressures; and the fluid pressure cylinders on the fluid pressure supplied side arranged on the left wheel side and the right wheel side of the vehicle, which are arranged at the diagonal positions, respectively apply the vertical forces acquired by converting the fluid pressures supplied from the fluid pressure cylinders on the fluid pressure supplying side to the left wheel side or the right wheel side of the body.

5. A vehicle behavior control apparatus according to claim 1, wherein:

the fluid pressure cylinder on the fluid pressure supplying side comprises a plurality of fluid pressure cylinders on the fluid pressure supplying side which are arranged in neighborhoods of left and right wheels of one of the front wheel side and the rear wheel side of the vehicle are connected to each other, and the fluid pressure cylinder on the fluid pressure supplied side comprises a plurality of fluid pressure cylinders on the fluid pressure supplied side which are arranged in neighborhoods of left and right wheels on another of the front wheel side and the rear wheel side of the vehicle are connected to each other;

the fluid pressure cylinders on the fluid pressure supplying side arranged on the right wheel side and the left wheel side of the vehicle and connected to each other convert the vertical forces acting on the right wheel side or the left wheel side of the body on the one of the front wheel side and the rear wheel side of the vehicle as the component forces of the predetermined driving force or braking force into the fluid pressures to supply the fluid pressure cylinders on the fluid pressure supplied side connected to each other with the fluid pressures; and the fluid pressure cylinders on the fluid pressure supplied side connected to each other respectively apply the vertical forces acquired by converting the fluid pressures supplied from the fluid pressure cylinders on the fluid pressure supplying side connected to each other to the right wheel side or the left wheel side of the body on the another of the front wheel side and the rear wheel side of the vehicle.

6. A vehicle behavior control apparatus according to claim 1, wherein, when the predetermined driving forces or braking forces are to be generated on a front wheel and a rear wheel of the vehicle via the braking/driving force generation mechanism in order to control a pitch behavior accompanying a vertical motion generated on the body that a vertical displacement direction on the front wheel side of the body and a vertical displacement direction on the rear wheel side of the body are opposite to each other, the electronic control unit controls the control circuit to connect the high-pressure-upon-extension chamber included in the fluid pressure cylinder on the fluid pressure supplying side and the contraction pressure chamber included in the fluid pressure cylinder on the fluid pressure supplied side to each other, or to connect the high-pressure-upon-contraction chamber included in the fluid pressure cylinder on the fluid pressure supplying side and the extension pressure chamber included in the fluid pressure cylinder on the fluid pressure supplied side to each other.

7. A vehicle behavior control apparatus according to claim 1, wherein, when the predetermined driving forces or braking forces are to be generated on a front wheel and a rear wheel of the vehicle via the braking/driving force generation mechanism in order to control a heave behavior accompanying a vertical motion generated on the body that a vertical displacement direction on the front wheel side of the body and a vertical displacement direction on the rear wheel side of the body are the same, the electronic control unit controls the control circuit to connect the high-pressure-upon-extension chamber included in the fluid pressure cylinder on the fluid pressure supplying side and the extension pressure chamber included in the fluid pressure cylinder on the fluid pressure supplied side to each other, or to connect the high-pressure-upon-contraction chamber included in the fluid pressure cylinder on the fluid pressure supplying side and the contraction pressure chamber included in the fluid pressure cylinder on the fluid pressure supplied side to each other.

8. A vehicle behavior control apparatus according to claim 1, wherein, when the predetermined driving forces or braking forces are to be generated on a right wheel and a left wheel of the vehicle via the braking/driving force generation mechanism in order to control a roll behavior accompanying a vertical motion generated on the body that a vertical displacement direction on the right wheel side of the body and a vertical displacement direction on the left wheel side of the body are opposite to each other, the electronic control unit controls the control circuit to:

connect the high-pressure-upon-extension chamber included in the fluid pressure cylinder on the fluid pressure supplying side and the extension pressure chamber included in the fluid pressure cylinder on the fluid pressure supplied side arranged on the same side out of the left side and the right side of the body to each other, or connect the high-pressure-upon-contraction chamber included in the fluid pressure cylinder on the fluid pressure supplying side and the contraction pressure chamber included in the fluid pressure cylinder on the fluid pressure supplied side arranged on the same side out of the left side and the right side of the body to each other; or connect the high-pressure-upon-extension chamber included in the fluid pressure cylinder on the fluid pressure supplying side and the contraction pressure chamber included in the fluid pressure cylinder on the fluid pressure supplied side arranged on sides opposite to each other out of the left side and the right side of the body to each other, or connect the high-pressure-upon-contraction chamber included in the fluid pressure cylinder on the fluid pressure supplying side and the extension pressure chamber included in the fluid pressure cylinder on the fluid pressure supplied side arranged on sides opposite to each other out of the left side and the right side of the body to each other.

9. A vehicle behavior control apparatus according to claim 1, wherein the electronic control unit controls the braking/driving force generation mechanism depending on the behavior of the body to generate the predetermined driving forces or braking forces on a plurality of the wheels while equalizing the predetermined driving forces or braking forces.

10. A vehicle behavior control apparatus according to claim 1, wherein the braking/driving force generation mechanism comprises motors assembled to the respective wheels of the vehicle, for each independently generating the predetermined driving force or braking force.

* * * * *